United States Patent
Morita

(10) Patent No.: US 10,910,828 B2
(45) Date of Patent: Feb. 2, 2021

(54) CURRENT LIMITING CIRCUIT, DC POWER SUPPLY CONNECTOR, AND DC POWER SOURCE DEVICE

(71) Applicant: Sony Corporation, Tokyo (JP)

(72) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 15/545,016

(22) PCT Filed: May 26, 2015

(86) PCT No.: PCT/JP2015/065071
§ 371 (c)(1),
(2) Date: Jul. 20, 2017

(87) PCT Pub. No.: WO2016/121140
PCT Pub. Date: Aug. 4, 2016

(65) Prior Publication Data
US 2018/0006447 A1    Jan. 4, 2018

(30) Foreign Application Priority Data

| Jan. 30, 2015 | (JP) | 2015-016273 |
| Mar. 19, 2015 | (JP) | 2015-056005 |
| May 7, 2015 | (JP) | 2015-094751 |

(51) Int. Cl.
H02H 9/02    (2006.01)
H01H 9/54    (2006.01)
(Continued)

(52) U.S. Cl.
CPC ............ *H02H 9/025* (2013.01); *H01H 9/542* (2013.01); *H01H 9/00* (2013.01); *H01H 50/54* (2013.01);
(Continued)

(58) Field of Classification Search
USPC .............................................. 361/93.7–93.9
See application file for complete search history.

(56) References Cited

U.S. PATENT DOCUMENTS 4,245,270 A * 1/1981 Busby .................... H02H 9/004
361/58
5,268,592 A * 12/1993 Bellamy ................ H02H 9/004
307/43
(Continued)

FOREIGN PATENT DOCUMENTS

| CN | 1346166 A | 4/2002 |
| CN | 103748747 A | 4/2014 |

(Continued)

OTHER PUBLICATIONS

Chinese Office Action dated Aug. 31, 2018 in connection with Chinese Application No. 201580073145.7 and English translation thereof.

(Continued)

*Primary Examiner* — Danny Nguyen
(74) *Attorney, Agent, or Firm* — Wolf, Greenfield & Sacks, P.C.

(57) ABSTRACT

A current limiting circuit configured to: before release of a touch between a second contact provided at a position where a terminal on a power receiving side in which a current flows at supply of DC power in an electrode that supplies the DC power touches before touching a first contact provided for the electrode at supply of the DC power and the terminal, decrease the current flowing into the terminal through the second contact; and avoid flowing a current in a case where the terminal is touching the first contact, and decrease the current flowing into the terminal through the second contact only in a case where the terminal is touching the second contact.

34 Claims, 23 Drawing Sheets

(51) Int. Cl.
*H01H 50/54* (2006.01)
*H01H 9/00* (2006.01)
*H02H 7/20* (2006.01)
*H01R 13/53* (2006.01)

(52) U.S. Cl.
CPC ....... *H01H 2009/546* (2013.01); *H01R 13/53* (2013.01); *H02H 7/20* (2013.01); *H02H 9/02* (2013.01)

(56) References Cited

U.S. PATENT DOCUMENTS

2003/0054683 A1* 3/2003 Bryan .................... H01R 13/66
439/181
2014/0154904 A1 6/2014 Strobl et al.

FOREIGN PATENT DOCUMENTS

| DE | 102 25 259 B3 | 1/2004 |
|---|---|---|
| JP | 2003-203721 A | 7/2003 |
| JP | 2004-158331 A | 6/2004 |
| JP | 2005-294080 A | 10/2005 |
| JP | 2009-146782 A | 7/2009 |
| JP | 2009-206066 A | 9/2009 |
| JP | 2010-088143 A | 4/2010 |
| JP | 2013-168347 A | 8/2013 |
| JP | 2014-522088 A | 8/2014 |
| JP | 2014-179189 A | 9/2014 |
| JP | 5862818 B1 | 2/2016 |

OTHER PUBLICATIONS

Extended European Search Report dated Oct. 29, 2018 in connection with European Application No. 15880035.9.
International Search Report and English translation thereof dated Jul. 14, 2015 in connection with International Application No. PCT/JP2015/065071.
Japanese Office Action dated May 28, 2019 in connection with Japanese Application No. 2015-199021, and English translation thereof.
Written Opinion and English translation thereof dated Jul. 14, 2015 in connection with International Application No. PCT/JP2015/065071.
International Preliminary Report on Patentability and English translation thereof dated Aug. 10, 2017 in connection with International Application No. PCT/JP2015/065071.

* cited by examiner

CURRENT LIMITING CIRCUIT, DC POWER SUPPLY CONNECTOR, AND DC POWER SOURCE DEVICE

CROSS-REFERENCE TO RELATED APPLICATIONS

This is a U.S. National Stage Application under 35 U.S.C. § 371, based on International Application No. PCT/JP2015/065071, filed in the Japanese Patent Office as a Receiving Office on May 26, 2015, which claims priority to Japanese Patent Application Number JP2015-094751, filed in the Japanese Patent Office on May 7, 2015, Japanese Patent Application Number JP2015-056005, filed in the Japanese Patent Office on Mar. 19, 2015, and Japanese Patent Application Number JP2015-016273, filed in the Japanese Patent Office on Jan. 30, 2015, each of which is hereby incorporated by reference in its entirety.

TECHNICAL FIELD

The present disclosure relates to a current limiting circuit, a DC power supply connector, and a DC power source device.

BACKGROUND ART

In either DC power feeding or AC power feeding, an arc discharge occurs at power off. In the case of AC, since there is an instant at which the voltage becomes zero at every predetermined time (for example, every 10 milliseconds), the arc discharge stops spontaneously at least within the above-described predetermined time (for example, within 10 milliseconds). In DC power feeding, however, the arc discharge does not stop spontaneously since there is no instant at which the voltage becomes zero.

Therefore, technologies for the purpose of suppressing occurrence of an arc discharge at power off in the case of DC power feeding have been disclosed (see Patent Literature 1, Patent Literature 2 and the like).

CITATION LIST

Patent Literature

Patent Literature 1: JP 2003-203721A
Patent Literature 2: JP 2014-522088T

DISCLOSURE OF INVENTION

Technical Problem

Occurrence of an arc discharge should certainly be suppressed at power off in the case of DC power feeding, while it is unpreferable that a configuration for suppressing occurrence of an arc discharge be increased in scale. It is also unpreferable that the addition of the configuration for suppressing occurrence of an arc discharge reduces power supply efficiency during DC power feeding. It is therefore desirable to suppress occurrence of an arc discharge at DC power off with a small-scale configuration without reducing power efficiency during DC power supply.

Therefore, the present disclosure proposes a current limiting circuit, a DC power supply connector, and a DC power source device being novel and improved that can suppress occurrence of an arc discharge at DC power off with a small-scale configuration without reducing power efficiency during DC power supply.

Solution to Problem

According to the present disclosure, there is provided a current limiting circuit configured to: before release of a touch between a second contact provided at a position where a terminal on a power receiving side in which a current flows at supply of DC power in an electrode that supplies the DC power touches before touching a first contact provided for the electrode at supply of the DC power and the terminal, decrease the current flowing into the terminal through the second contact; and avoid flowing a current in a case where the terminal is touching the first contact, and decrease the current flowing into the terminal through the second contact only in a case where the terminal is touching the second contact.

In addition, according to the present disclosure, there is provided a DC power supply connector at least including: a positive-electrode-side electrode and a negative-electrode-side electrode configured to supply DC power. At least any of the positive-electrode-side electrode and the negative-electrode-side electrode includes a first contact, a second contact provided at a position where a terminal on a power receiving side in which a DC current flows at supply of the DC power touches before touching the first contact, and a current limiting circuit configured to decrease the current flowing into the terminal through the second contact before release of a touch between the terminal and the second contact. The current limiting circuit does not flow a current in a case where the terminal is touching the first contact, and the current limiting circuit decreases the current flowing into the terminal through the second contact only in a case where the terminal is touching the second contact.

In addition, according to the present disclosure, there is provided a DC power source device at least including: a DC power source configured to supply DC power; and a positive-electrode-side electrode and a negative-electrode-side electrode configured to supply the DC power from the DC power source. At least any of the positive-electrode-side electrode and the negative-electrode-side electrode includes a first contact, a second contact provided at a position where a terminal on a power receiving side in which a DC current flows at supply of the DC power touches before touching the first contact, and a current limiting circuit configured to decrease the current flowing into the terminal through the second contact before release of a touch between the terminal and the second contact. The current limiting circuit does not flow a current in a case where the terminal is touching the first contact, and the current limiting circuit decreases the current flowing into the terminal through the second contact only in a case where the terminal is touching the second contact.

Advantageous Effects of Invention

According to the present disclosure as described above, there can be provided a current limiting circuit, a DC power supply connector, and a DC power source device being novel and improved that can suppress occurrence of an arc discharge at DC power off with a small-scale configuration without reducing power efficiency during DC power supply.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
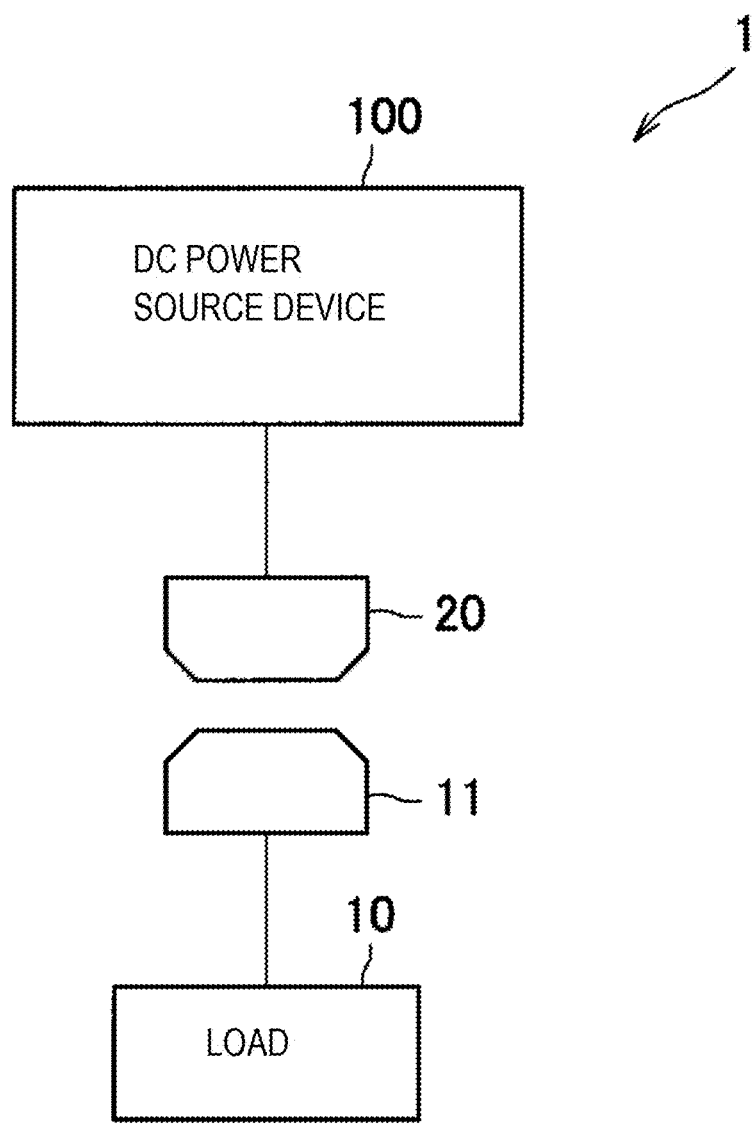
FIG. 1 is an explanatory diagram showing an exemplary configuration of a DC power supply system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of the present disclosure
1.1. Background
1.2. Exemplary configuration
2. Conclusion

1. Embodiment of the Present Disclosure

[1.1. Background]

Before describing an embodiment of the present disclosure in detail, the background of the embodiment of the present disclosure will be described first.

In either DC power feeding or AC power feeding, a spark or an arc discharge due to a potential difference between electrodes occurs at power off when a voltage and a current reach certain predetermined values or higher. In the case of AC, since there is an instant at which the voltage becomes zero at every predetermined time (for example, every 10 milliseconds), the arc discharge stops spontaneously at least within the above-described predetermined time (for example, within 10 milliseconds).

In DC power feeding, however, the arc discharge does not stop spontaneously since there is no instant at which the voltage becomes zero unlike AC power feeding. The arc discharge may cause degradation of contacts, such as metal fusing or welding, and may reduce reliability of power feeding.

Therefore, technologies for the purpose of suppressing occurrence of an arc discharge at power off in the case of DC power feeding have been disclosed. For example, an avoidance technology by connecting a snubber circuit, in which a capacitor and a resistor are used, between oscillating contact elements has been conventionally proposed.

In order to prevent an arc discharge using the snubber circuit in the case of DC power feeding, however, sufficient effects will not be obtained unless a large-capacity capacitor and a small resistor are used. For obtaining sufficient effects, the snubber circuit will be increased in size. Moreover, in the case of preventing an arc discharge using the snubber circuit, a short-circuit current due to charges charged in the large-capacity capacitor will be increased if an attempt is made to make reconnection to a DC power source after DC power off, so that contacts will be welded.

Furthermore, in a case of performing DC power feeding by inserting/removing an insertion plug in/from a plug receiver, there is also a technology for providing the insertion plug with a mechanical switch to prevent occurrence of an arc discharge, and operating the mechanical switch when removing the insertion plug from the plug receiver, thereby preventing occurrence of an arc discharge. However, this technology raises the need to force a user to perform a complicated operation of operating the mechanical switch at removal of the insertion plug.

There is also a method of mechanically removing an arc discharge. In order to mechanically remove an arc discharge, however, a structure is required which increases the speed of detaching contacts or detaches arcs by a magnetic circuit, resulting in size increase of a circuit for removing an arc discharge.

The technologies for the purpose of suppressing occurrence of an arc discharge at power off in the case of DC power feeding are found additionally in the above-mentioned Patent Literature 1, Patent Literature 2 and the like.

The above-mentioned Patent Literature 1 discloses a technology for providing a switching element on a path along which a current flows during DC power feeding, and turning off the switching element at removal of the insertion plug from the plug receiver, thereby suppressing occurrence of an arc discharge.

According to the technology disclosed in the Patent Literature 1, however, power is consumed in the switching element during DC power feeding and the switching element generates heat during DC power feeding since a current flows through the switching element during DC power feeding.

The above-mentioned Patent Literature 2 also discloses a technology for providing an arc absorbing circuit including switching elements on a path along which a current flows during DC power feeding, and turning off the switching elements at removal of the insertion plug from the plug receiver, thereby suppressing occurrence of an arc discharge.

According to the technology disclosed in the Patent Literature 2, however, two switching elements as the arc absorbing circuit and a timer for turning off the switching element are provided, which requires a circuit for temporarily storing arc power and discharging the stored power, resulting in size increase of the circuit.

In consideration of the above-described background, the discloser of the present application has therefore conducted intense study on a technology capable of suppressing occurrence of an arc discharge with a small-scale configuration at DC power off without reducing power efficiency during DC power supply. As a result, the discloser of the present application has devised a technology capable of suppressing occurrence of an arc discharge with a small-scale configuration at DC power off without reducing power efficiency during DC power supply by providing a positive-electrode-side electrode with two contacts and, when switching contacts with a power-receiving-side electrode, suppressing a voltage generated between the electrodes at DC power off, as will be described below.

The background of the embodiment of the present disclosure has been described above. Next, an embodiment of the present disclosure will be described in detail.

[1.2. Exemplary Configuration]

First, an exemplary configuration of a DC power supply system according to an embodiment of the present disclosure will be described. FIG. 1 is an explanatory diagram showing an exemplary configuration of a DC power supply system according to an embodiment of the present disclosure. Hereinbelow, the exemplary configuration of the DC power supply system according to an embodiment of the present disclosure will be described using FIG. 1.

FIG. 1 shows an exemplary configuration of a DC power supply system 1 including a DC power source device 100 that feeds DC power and a load 10 that receives DC power from the DC power source device 100. The DC power source device 100 is a power source device that feeds DC power, and for example, may be a device that includes a storage battery in the inside to feed DC power to the load 10, or may be a device that feeds power generated by sunlight, wind power, geothermal heat, biomass, or another type of natural energy to the load 10 as DC power.

When the load 10 receives feeding of DC power from the DC power source device 100, a plug 11 is inserted in the plug receiver 20. Then, when stopping feeding of DC power from the DC power source device 100, the plug 11 is removed from the plug receiver 20. Failure in considering suppression of an arc discharge leads to damage or the like to the plug 11 or the plug receiver 20 as described above when the plug 11 is removed from the plug receiver 20.

Therefore, in the present embodiment, the DC power source device 100 includes a current limiting circuit for suppressing a current flowing from the DC power source device 100 to the load 10 when the plug 11 is removed from the plug receiver 20 in order to suppress an arc discharge when the plug 11 is removed from the plug receiver 20.

The DC power source device 100 is configured such that no current flows in the current limiting circuit provided for the DC power source device 100 when the plug 11 is completely inserted in the plug receiver 20 and while DC power is fed from the DC power source device 100 to the load 10. Moreover, when the plug 11 is removed from the plug receiver 20, the current limiting circuit functions for the current flowing from the DC power source device 100 to the load 10 to decrease while flowing the current from the DC power source device 100 to the load 10 through the current limiting circuit.

In the present embodiment, occurrence of an arc discharge can be suppressed at DC power off without reducing power efficiency during DC power supply by providing the DC power source device 100 with the current limiting circuit as described above. Moreover, since the current limiting circuit according to the present embodiment can be a small-scale circuit as will be described later, occurrence of an arc discharge can be suppressed at DC power off without increasing the circuit scale.

Figure 2:
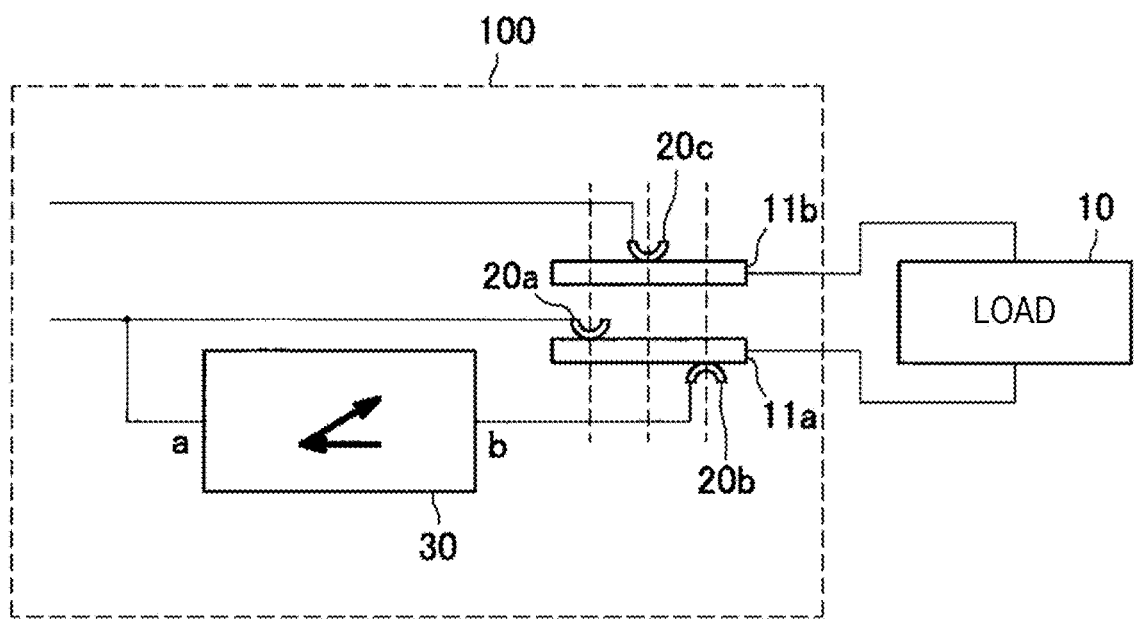
FIG. 2 is an explanatory diagram showing an exemplary configuration of a DC power source device 100.

FIG. 2 is an explanatory diagram showing an exemplary configuration of the DC power source device 100. As shown in FIG. 2, the DC power source device 100 includes a current limiting circuit 30. Moreover, the plug receiver 20 included in the DC power source device 100 has two contact elements 20a, 20b on a positive electrode side and one contact element 20c on a negative electrode side, respectively.

The current limiting circuit 30 is a circuit that functions for the current flowing through the current from the DC power source device 100 to the load 10 to decrease to such a degree that an arc discharge does not occur when the plug 11 is completely removed from the plug receiver 20 while flowing the current from the DC power source device 100 to the load 10 through the current limiting circuit 30 when the plug 11 is removed from the plug receiver 20. The current limiting circuit 30 is configured such that no current flows when the plug 11 is completely inserted in the plug receiver 20 and while DC power is fed from the DC power source device 100 to the load 10.

Figure 3:
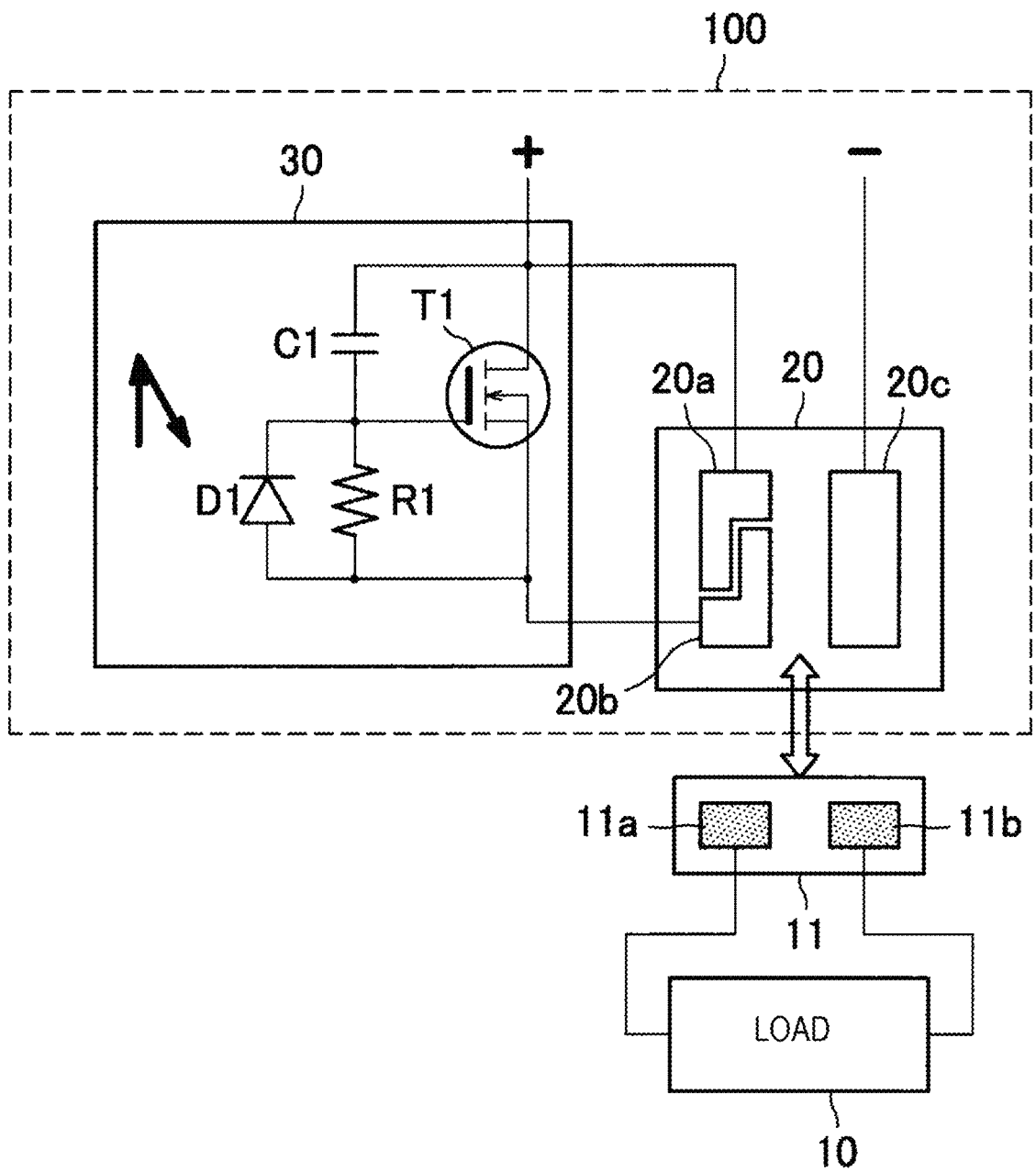
FIG. 3 is an explanatory diagram showing a specific exemplary configuration of the DC power source device 100.

FIG. 3 is an explanatory diagram showing a specific exemplary configuration of the DC power source device 100. As shown in FIG. 3, the DC power source device 100 includes the current limiting circuit 30. Moreover, the plug receiver 20 included in the DC power source device 100 has the two contact elements 20a, 20b on the positive electrode side and the one contact element 20c on the negative electrode side, respectively.

Figure 4:
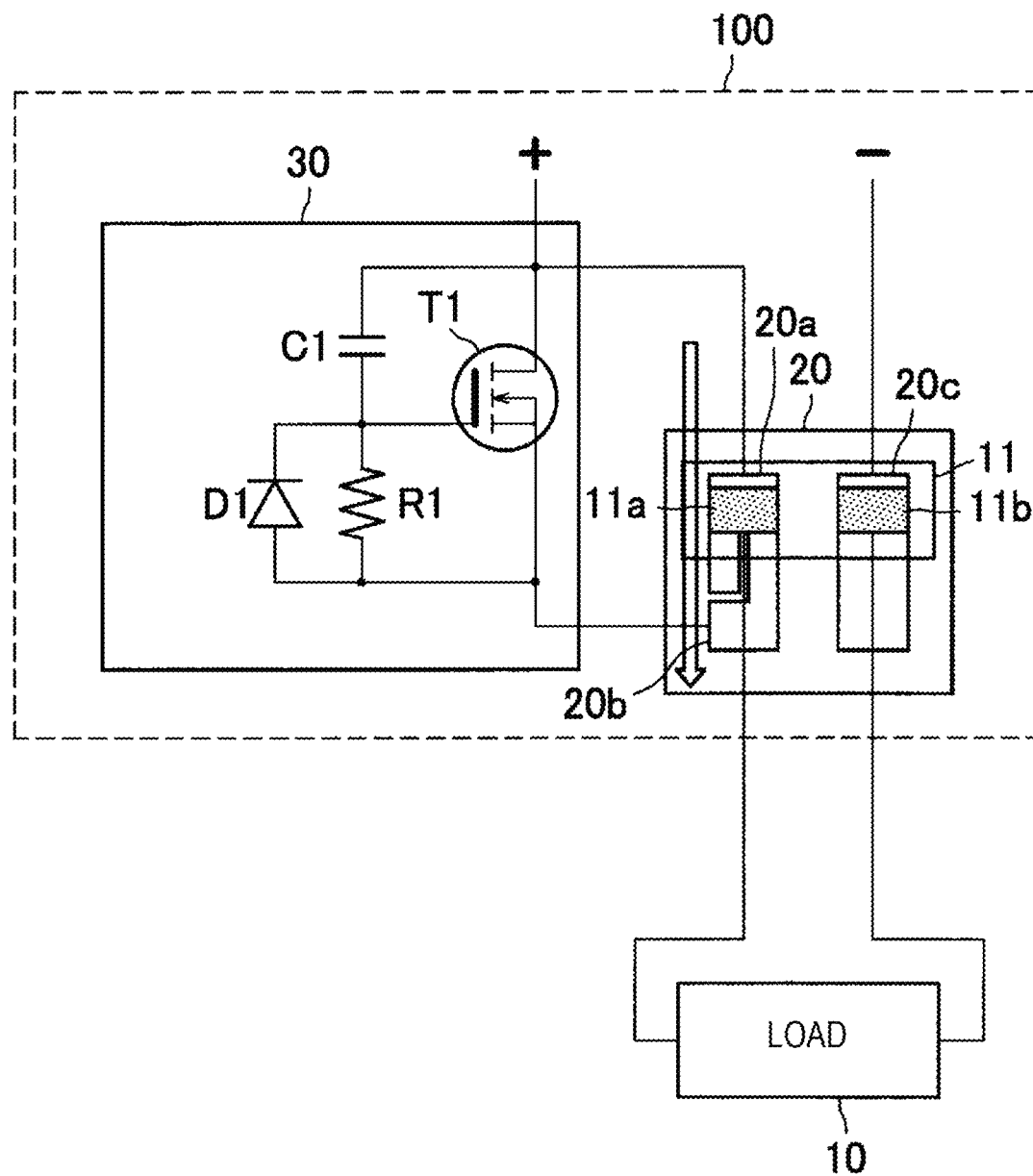
FIG. 4 is an explanatory diagram showing a state where a plug 11 has been inserted in a plug receiver 20.

The plug 11 of the load 10 includes a positive-electrode-side terminal 11a and a negative-electrode-side terminal 11b. FIG. 4 is an explanatory diagram showing a state where the plug 11 has been inserted in the plug receiver 20. When the plug 11 is inserted in the plug receiver 20, the positive-electrode-side terminal 11a is first connected to the contact element 20b, and after connection to the contact element 20b, is connected to the contact element 20a as shown in FIG. 4.

Figure 5:
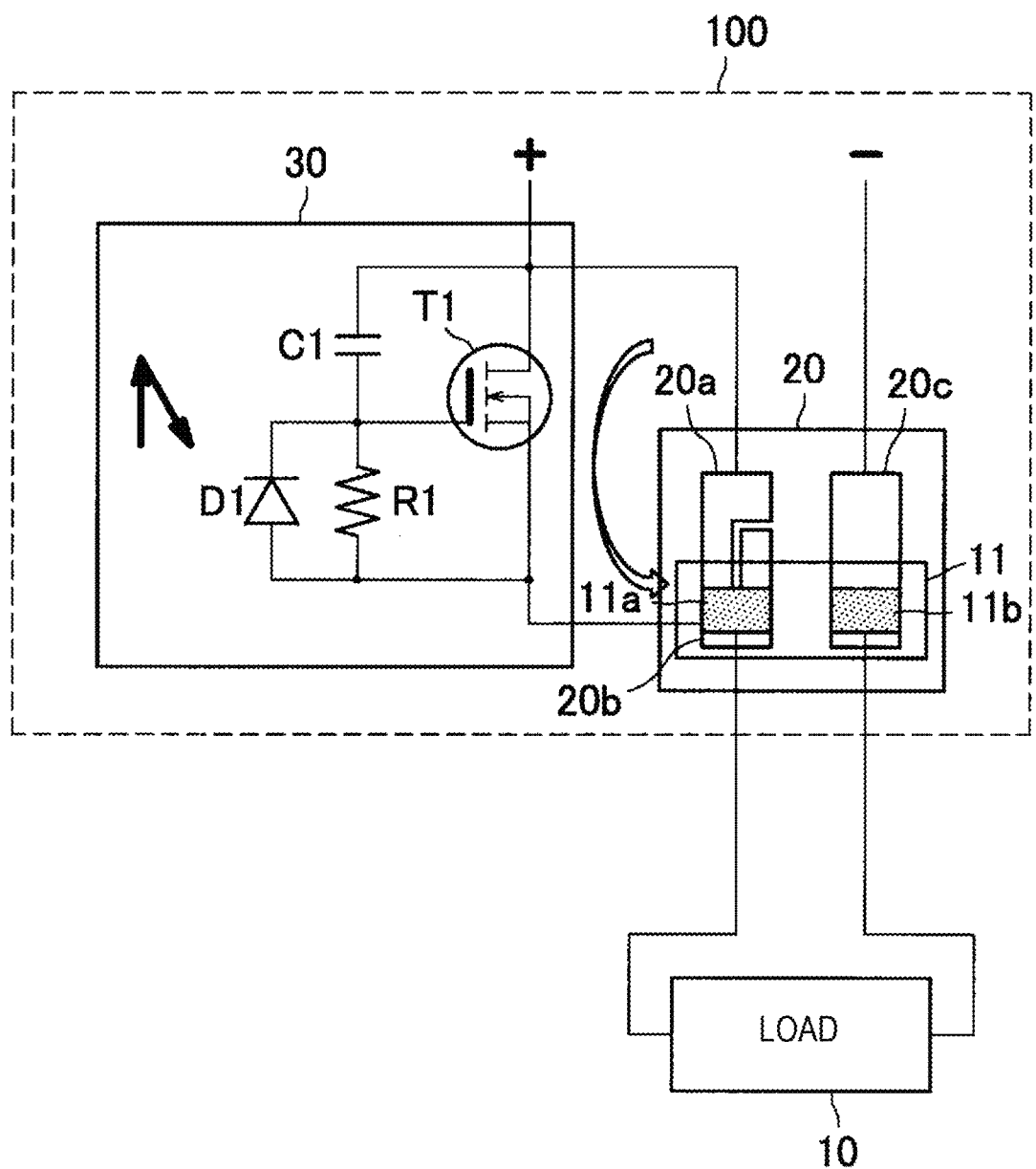
FIG. 5 is an explanatory diagram showing a state where the plug 11 is being removed from the plug receiver 20.

FIG. 5 is an explanatory diagram showing a state where the plug 11 is being removed from the plug receiver 20. When the plug 11 is removed from the plug receiver 20, the positive-electrode-side terminal 11a in the state connected to the contact element 20a is connected to the contact element 20b as shown in FIG. 5 along with the removal, and is thereafter completely removed from the plug receiver 20.

In the current limiting circuit 30, no current flows in the state where the plug 11 has been completely inserted in the plug receiver 20 and the contact element 20a and the contact element 20b are short-circuited by the positive-electrode-side terminal 11a, while a current flows in the state where the positive-electrode-side terminal 11a is connected to the contact element 20b. Therefore, since no current flows in the current limiting circuit 30 in the state where the plug 11 has been completely inserted in the plug receiver 20, the DC power source device 100 can feed DC power to the load 10 without reducing power efficiency during DC power supply.

The current limiting circuit 30 includes a MOSFET T1, a capacitor C1, a resistor R1, and a diode D1. The current limiting circuit 30 functions as a voltage integrating circuit.

In the present embodiment, an n-type metal oxide semiconductor field effect transistor (MOSFET) is used for the MOSFET T1, and is provided on a path along which a current flows from the DC power source device 100 to the load 10 in the state where the positive-electrode-side terminal 11a of the plug 11 is connected to the contact element 20b of the plug receiver 20. The capacitor C1 is provided between a drain terminal and a gate terminal of the MOSFET T1. Moreover, the resistor R1 is provided between the gate terminal and a source terminal of the MOSFET T1. Furthermore, the capacitor C1 and the resistor R1 are connected in series.

Figure 6:
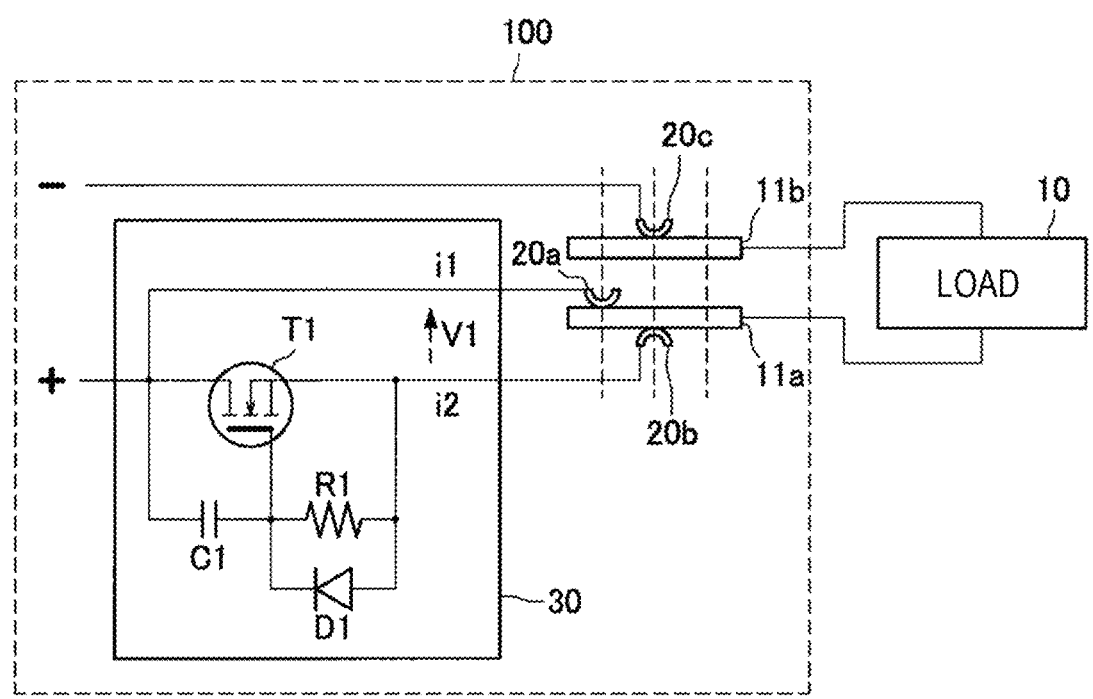
FIG. 6 is an explanatory diagram schematically showing a state where the plug 11 has been inserted in the DC power source device 100.

The function of the current limiting circuit 30 will be described also using FIG. 6 and FIG. 7 together. FIG. 6 is an explanatory diagram schematically showing laterally a state where the load 10 including the plug 11 has been inserted in the plug receiver 20 of the DC power source device 100. FIG. 6 shows a state where the positive-electrode-side terminal 11a is touching both of the contact element 20a and the contact element 20b. Moreover, FIG. 6 is an explanatory diagram showing exemplary transitions of currents and voltage when removing from the plug 11 from the plug receiver 20.

As described above, in the state where the plug 11 has been completely inserted in the plug receiver 20 and the positive-electrode-side terminal 11a touches both of the contact element 20a and the contact element 20b to short-circuit the contact element 20a and the contact element 20b, no current flows in the current limiting circuit 30. When the plug 11 is started being removed from the plug receiver 20, the both ends of the current limiting circuit 30 are short-circuited by the positive-electrode-side terminal 11a, and thus, the MOSFET T1 is also in the off state.

Thereafter, the plug 11 is further removed continuously from the plug receiver 20, and when the positive-electrode-side terminal 11a no longer touches the contact element 20a at a position X1 and only touches the contact element 20b, current concentration occurs at a part of a touch point between the positive-electrode-side terminal 11a and the contact element 20a, and a voltage due to the current concentration is generated between the contact element 20a and the contact element 20b.

The voltage generated between the contact element 20a and the contact element 20b induces the gate voltage of the MOSFET T1 via the capacitor C1 to bring the MOSFET T1 into the on state. When the MOSFET T1 is brought into the on state, a current flows in a direction that the voltage between the contact element 20a and the contact element 20b drops.

With the MOSFET T1 brought into the on state and the current flowing into the direction that the voltage between the contact element 20a and the contact element 20b drops, the potential difference between the positive-electrode-side terminal 11a and the contact element 20a is reduced. With the potential difference between the positive-electrode-side terminal 11a and the contact element 20a reduced, separation of the positive-electrode-side terminal 11a from the contact element 20a will not lead to occurrence of an arc discharge.

The voltage between the drain terminal and the source terminal of the MOSFET T1 falls within voltages along the transfer function in terms of the gate voltage of the FET. When charging of the capacitor C1 is advanced by the voltage generated between the contact element 20a and the contact element 20b after the positive-electrode-side terminal 11a is separated from the contact element 20a, the gate voltage of the MOSFET T1 drops, and the MOSFET T1 transitions to the off state, so that the current no longer flows in the MOSFET T1. Separation of the positive-electrode-side terminal 11a from the contact element 20b after the MOSFET T1 transitions to the off state will not lead to occurrence of an arc discharge since no current flows in the MOSFET T1.

The diode D1 connected in parallel with the resistor R1 of the current limiting circuit 30 is provided for discharging charges accumulated in the capacitor C1 within a short period of time without passing through the resistor R1 in the case where the positive-electrode-side terminal 11a touches both of the contact element 20a and the contact element 20b to short-circuit the contact element 20a and the contact element 20b.

With the diode D1 provided in parallel with the resistor R1 in the current limiting circuit 30, the voltage integrating function of the current limiting circuit 30 can be recovered within a short period of time even if connection between the contact element 20a and the contact element 20b, for example, causes a phenomenon such as chattering. The resistor R1 supplies a voltage to the gate terminal of the MOSFET T1. The time for supplying the voltage is determined in relation to the product of the capacitance of the capacitor C1 and the resistance value of the resistor R1.

Figure 7:
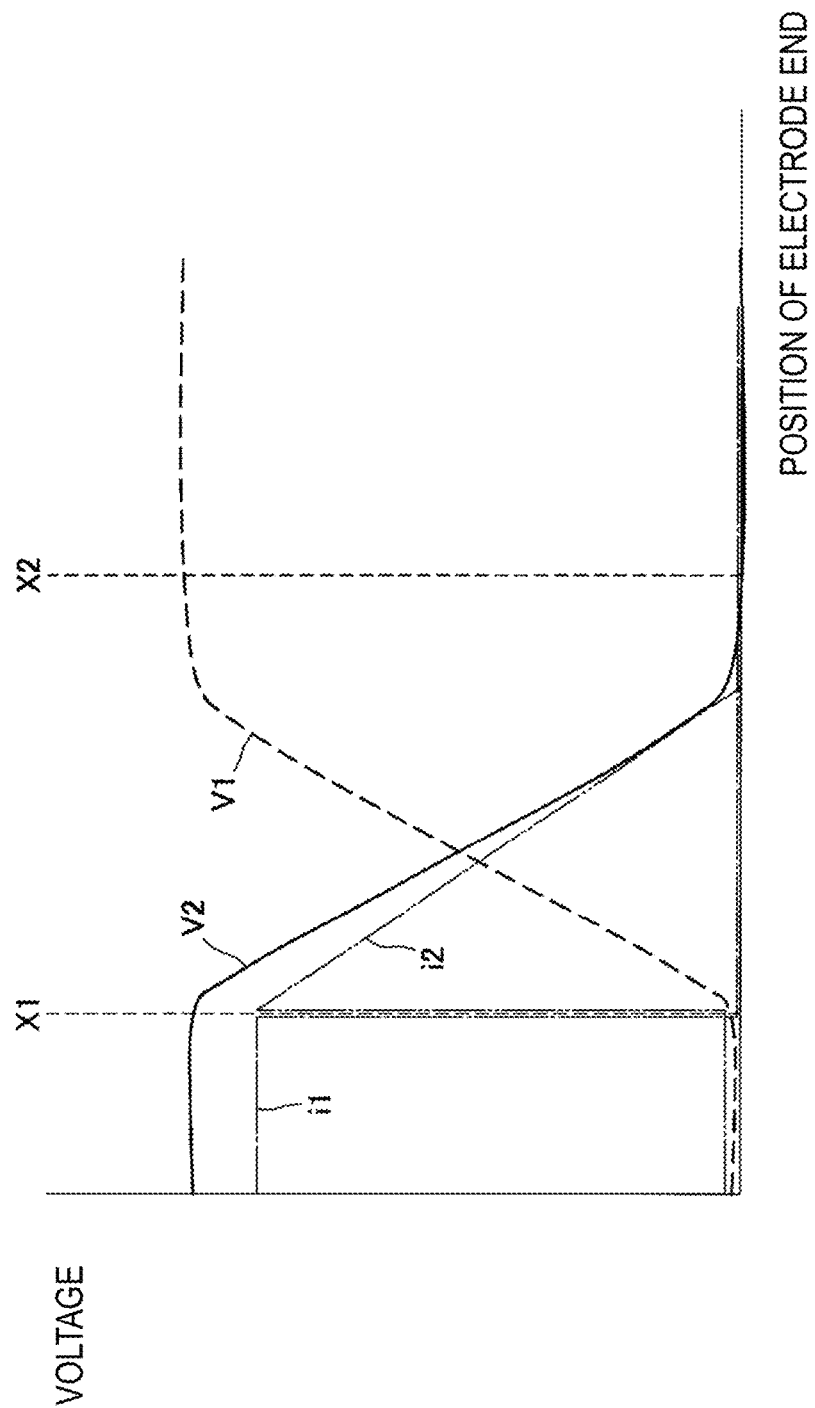
FIG. 7 is an explanatory diagram showing voltage changes of an end-to-end voltage V1 of a current limiting circuit 30 and voltage changes of a voltage V2 applied to a load 10 in relation to the place where the plug 11 is inserted.

FIG. 7 shows voltage changes of an end-to-end voltage V1 of the current limiting circuit 30 and voltage changes of a voltage V2 applied to the load 10 in relation to the place where the plug 11 is inserted. FIG. 7 also shows current changes of a current i1 flowing to the contact element 20a side and a current i2 flowing to the contact element 20b side in relation to the place where the plug 11 is inserted.

At a position X1 where the positive-electrode-side terminal 11a is separated from the contact element 20a, the end-to-end voltage V1 of the current limiting circuit 30 remains at a constant voltage, and as removal of the plug 11 progresses, the end-to-end voltage V1 rises gradually, while the voltage V2 applied to the load 10 drops gradually.

Moreover, at the position X1 where the positive-electrode-side terminal 11a is separated from the contact element 20a, the current i1 flowing to the contact element 20a side drops suddenly to 0 A, while the current i2 flowing to the contact element 20b side rises suddenly from 0 A. With the current i1 dropping suddenly to 0 A and the current i2 rising suddenly from 0 A, the current limiting circuit 30 suppresses occurrence of a potential difference between the positive-electrode-side terminal 11a and the contact element 20a.

Then, at a position X2 where the positive-electrode-side terminal 11a is separated from the contact element 20b, the drop in the voltage V2 applied to the load 10 and the current i2 has progressed, and there is no condition where current concentration between the positive-electrode-side terminal 11a and the contact element 20b occurs. Therefore, separation of the positive-electrode-side terminal 11a from the contact element 20b will not lead to occurrence of an arc discharge.

Note that, in the above-described example, an n-type MOSFET is used for the MOSFET T1, and the current limiting circuit 30 having the voltage integrating function is disposed on the positive electrode side, whilst the present disclosure is not limited to such an example. A p-type MOSFET may be used, and the current limiting circuit 30 having the voltage integrating function may be disposed at the negative electrode.

Moreover, the above-described example has shown the case of DC power feeding in the two-wire system with positive and negative electrodes, whilst the current limiting circuit 30 having the voltage integrating function may also be disposed in a case of DC power feeding in a three-wire system with a positive electrode, neutral and a negative electrode. In the case of DC power feeding in the three-wire system, occurrence of an arc discharge at removal of the plug can be suppressed by disposing the current limiting circuits 30 at both electrodes of the positive electrode and the negative electrode.

Figure 8:
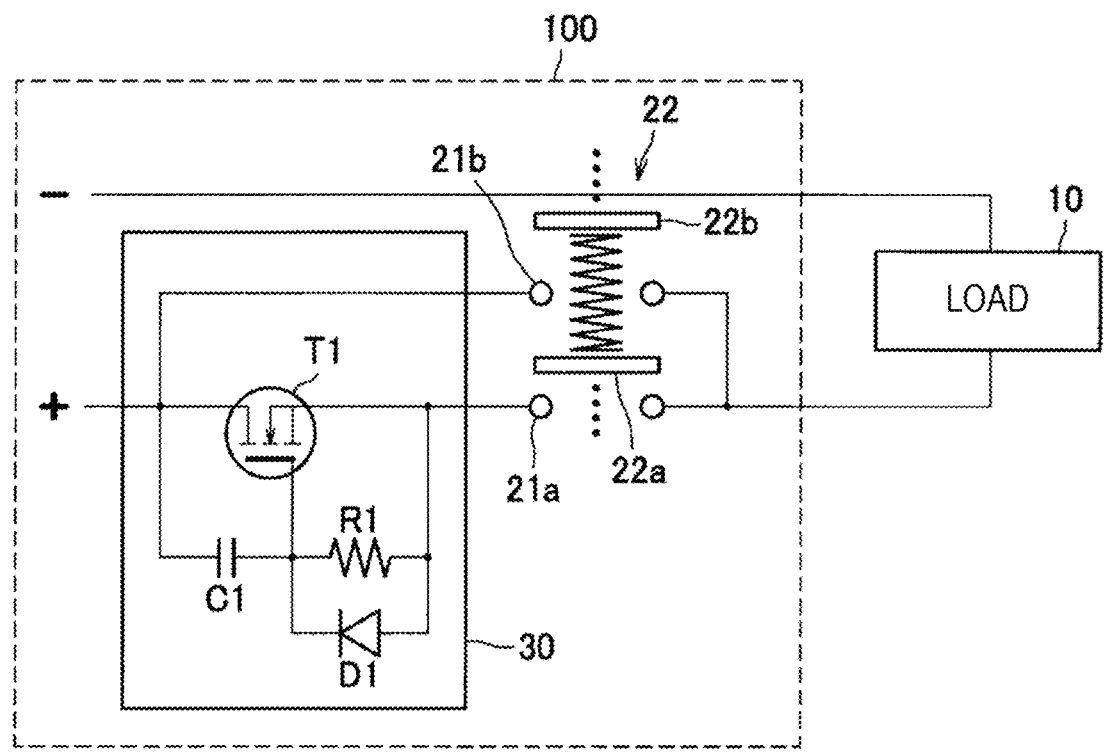
FIG. 8 is an explanatory diagram showing a variation of the DC power source device 100.

The example in which start and stop of DC power feeding from the DC power source device 100 is performed by inserting and removing the plug 11 has been described, whilst the present disclosure is not limited to such an example. FIG. 8 is an explanatory diagram showing a variation of the DC power source device 100. Shown in FIG. 8 is an example in which start and stop of DC power feeding from the DC power source device 100 is performed by operating a switch 22 including terminals 22a and 22b.

The switch 22 shown in FIG. 8 is configured such that the terminals 22a and 22b touch both of the contact elements 21a and 21b when starting DC power feeding from the DC power source device 100, and when stopping DC power feeding from the DC power source device 100, the terminal 22b is first separated from the contact element 21b, and after the terminal 22b is separated from the contact element 21b, the terminal 22a is separated from the contact element 21a by an elastic force of a spring or the like.

Even in the case where start and stop of DC power feeding from the DC power source device 100 is performed by the switch 22 as shown in FIG. 8, occurrence of an arc discharge when turning off the switch 22 can be suppressed by disposing the current limiting circuit 30.

Figure 9:
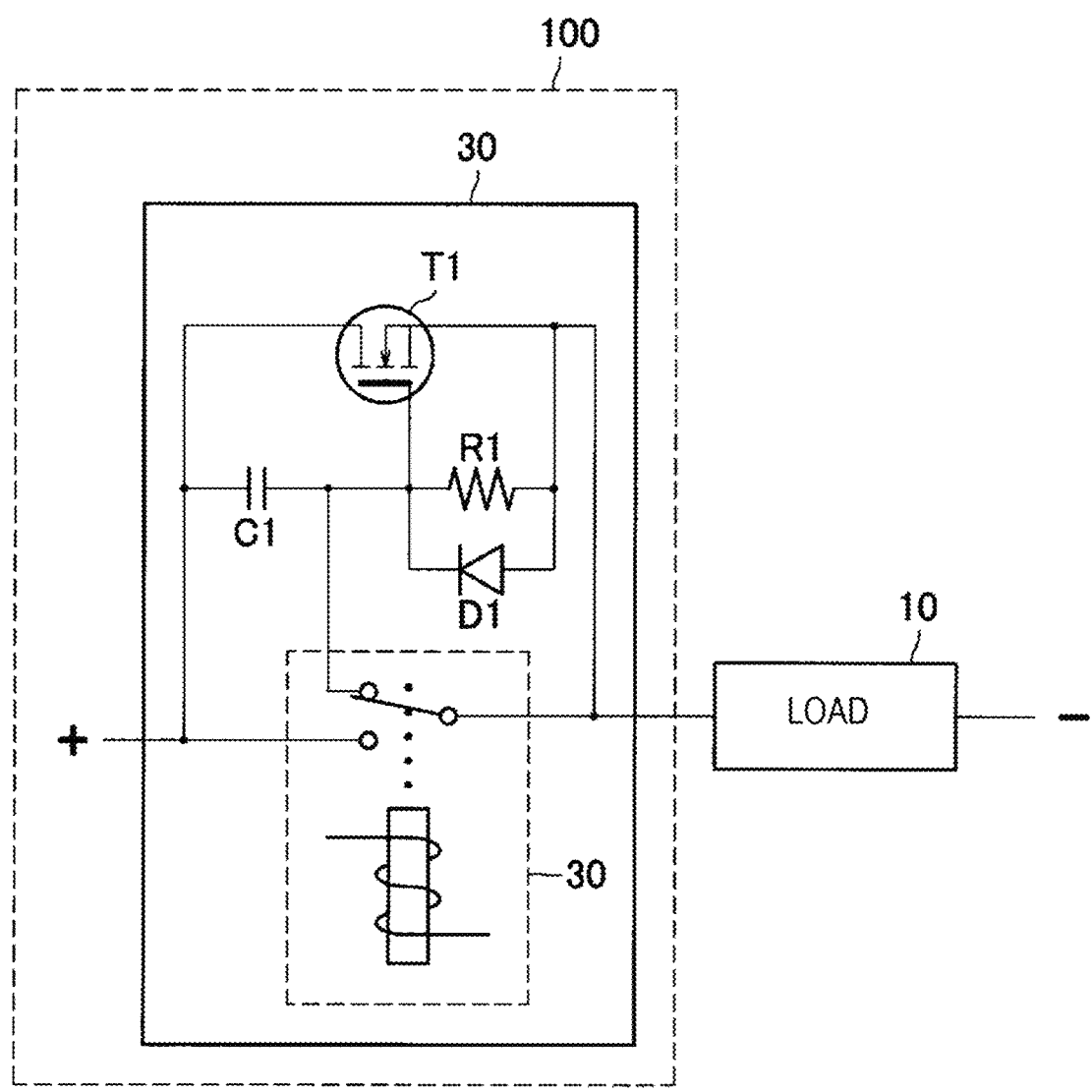
FIG. 9 is an explanatory diagram showing a variation of the DC power source device 100.

FIG. 9 is an explanatory diagram showing a variation of the DC power source device 100. Shown in FIG. 9 is an example in which the DC power source device 100 is provided with a DC relay 31 and start and stop of DC power feeding from the DC power source device 100 is performed by the DC relay 31.

In the case where start and stop of DC power feeding from the DC power source device 100 is performed by the DC relay 31 as in FIG. 9, the MOSFET T1 may be turned on at an instant when the capacitor C1 is charged with charges to flow an excessive current to the load 10.

Therefore, in order to avoid turning on the MOSFET T1 at an instant when the capacitor C1 is charged with charges to flow an excessive current to the load 10, the current generated by charges charged in the capacitor C1 is bypassed via a make contact of the DC relay 31 as shown in FIG. 9. By bypassing the current generated by charges charged in the capacitor C1 via the make contact of the DC relay 31, a flow of an excessive current to the load 10 can be suppressed.

Figure 10:
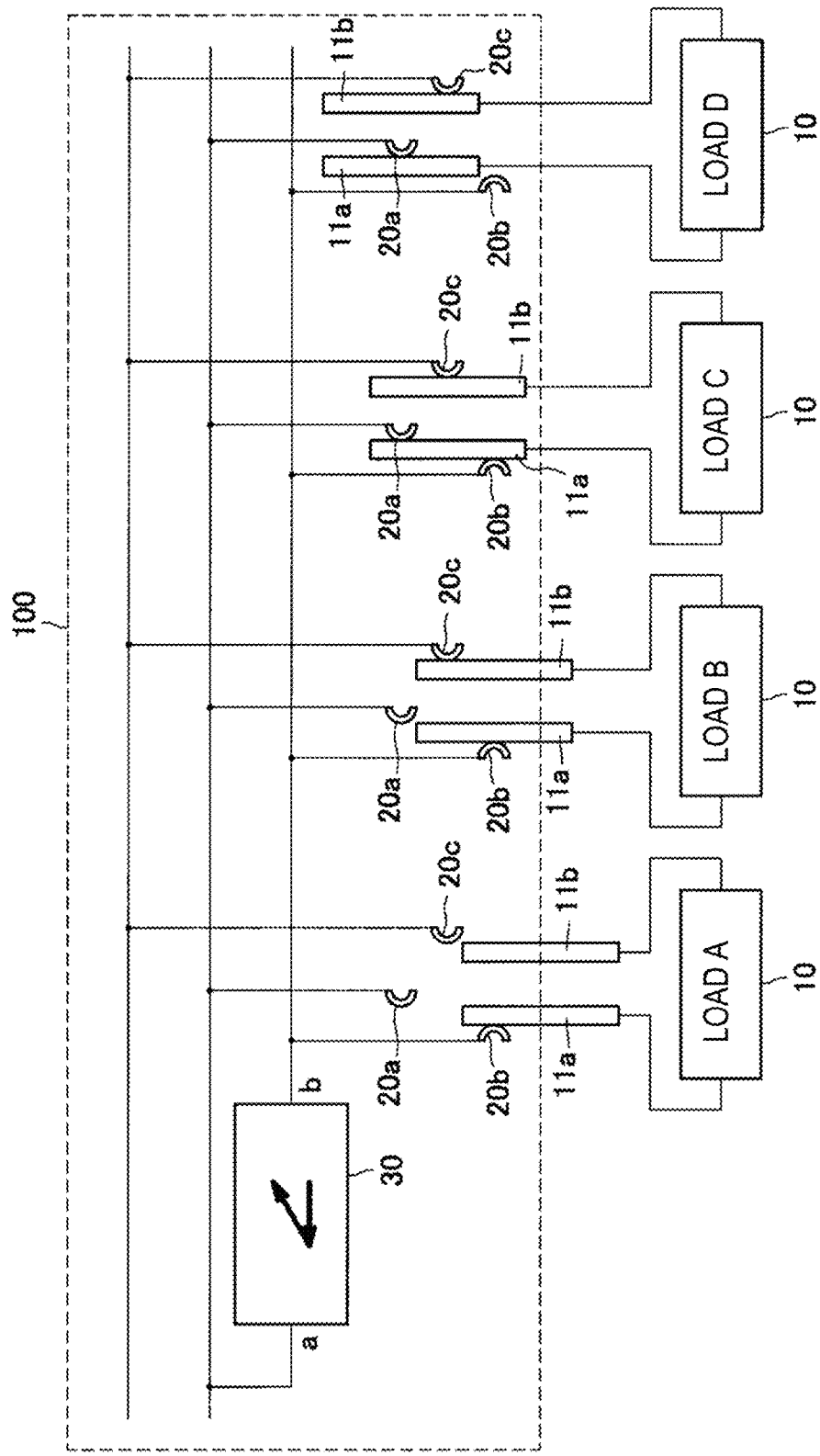
FIG. 10 is an explanatory diagram showing an exemplary configuration in a case where a plurality of plug receivers 20 exist in the DC power source device 100.

FIG. 10 is an explanatory diagram showing an exemplary configuration in a case where a plurality of plug receivers 20 exist in the DC power source device 100. Even in the case where the plurality of plug receivers 20 exist in the DC power source device 100 as shown in FIG. 10, occurrence of an arc discharge at removal of the plug 11 from the plug receiver 20 can be suppressed by one current limiting circuit 30.

In the case of connecting DC power source devices that feed DC power to each other, each of the DC power source devices can also suppress occurrence of an arc discharge at removal of the plug 11 from the plug receiver 20 by providing each of the DC power source devices with a current limiting circuit. For example, in such a case of connecting DC power source devices each including a battery to each other and charging the battery of one of the DC power source devices with the other DC power source device, each of the DC power source devices can suppress occurrence of an arc discharge at removal of the plug 11 from the plug receiver 20 by including the current limiting circuit.

Figure 11:
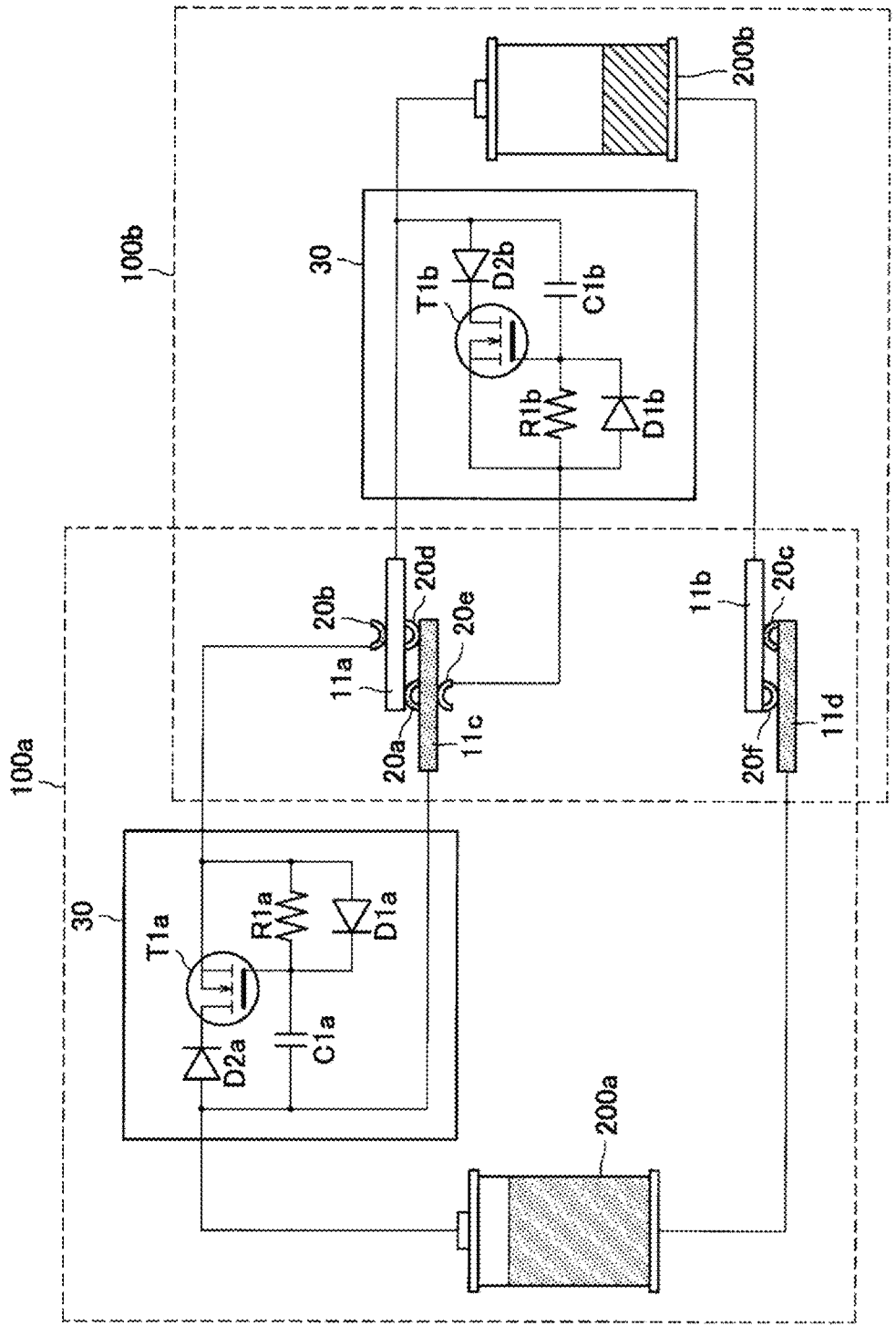
FIG. 11 is an explanatory diagram showing an exemplary configuration in a case of connecting two DC power source devices 100a and 100b.

FIG. 11 is an explanatory diagram showing an exemplary configuration in a case of connecting two DC power source devices 100a and 100b. The DC power source device 100a includes the contact elements 20a, 20b and 20c, and also includes a positive-electrode-side terminal 11c and a negative-electrode-side terminal 11d of the plug. The DC power source device 100b includes contact elements 20d, 20e and 20f, and also includes the positive-electrode-side terminal 11a and the negative-electrode-side terminal 11b of the plug.

For example, in the case of connecting the DC power source device 100b to the DC power source device 100a to receive power supply from the DC power source device 100a, the positive-electrode-side terminal 11a and the negative-electrode-side terminal 11b of the plug are inserted in the DC power source device 100a. Then, when stopping power supply in the DC power source device 100b from the DC power source device 100a, the positive-electrode-side terminal 11a and the negative-electrode-side terminal 11b of the plug are removed from the DC power source device 100a, and at removal the current limiting circuit 30 functions to suppress occurrence of an arc discharge between the positive-electrode-side terminal 11a and the contact elements 20a, 20b.

Similarly, in the case of connecting the DC power source device 100a to the DC power source device 100b to receive power supply from the DC power source device 100b, the positive-electrode-side terminal 11c and the negative-electrode-side terminal 11d of the plug are inserted in the DC power source device 100b. Then, when stopping power supply in the DC power source device 100a from the DC power source device 100b, the positive-electrode-side terminal 11c and the negative-electrode-side terminal 11d of the plug are removed from the DC power source device 100b. When the positive-electrode-side terminal 11c and the negative-electrode-side terminal 11d of the plug are removed from the DC power source device 100b, the current limiting circuit 30 functions to suppress occurrence of an arc discharge between the positive-electrode-side terminal 11c and the contact elements 20d, 20e.

Note that in the case of connecting the two DC power source devices 100a and 100b, it is desirable to prevent current backflow by providing a diode D2 on the drain electrode side of the MOSFET T1 of the current limiting circuit 30.

In the case of connecting the DC power source devices 100a and 100b each including a battery to each other as shown in FIG. 11 and charging the battery of one of the DC power source devices with the other DC power source device, occurrence of an arc discharge at removal of the terminals of the plug from the contact elements can be suppressed with the DC power source devices 100a and 100b provided with the current limiting circuit 30.

The exemplary configuration for suppressing occurrence of an arc discharge at removal of the plug 11 from the plug receiver 20 has been described so far. Next, an exemplary configuration for suppressing occurrence of a spark (thermal arc) at insertion of the plug 11 in the plug receiver 20 will be described.

Figure 12:
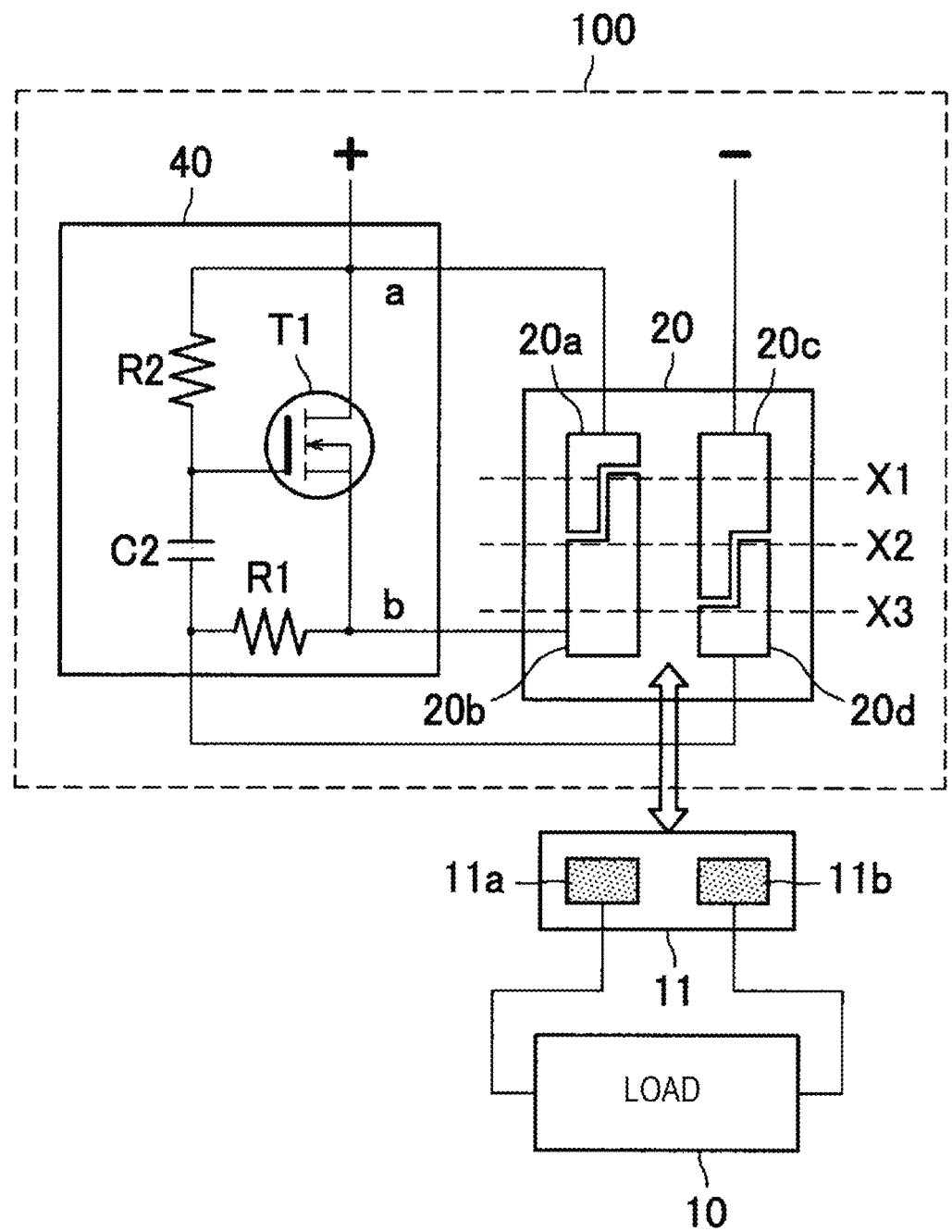
FIG. 12 is an explanatory diagram showing an exemplary configuration of the DC power source device 100 according to an embodiment of the present disclosure.

FIG. 12 is an explanatory diagram showing an exemplary configuration of the DC power source device 100 according to an embodiment of the present disclosure. The DC power source device 100 shown in FIG. 12 includes a current limiting circuit 40 for suppressing occurrence of a spark (thermal arc) occurring at insertion of the plug 11 in the plug receiver 20.

The current limiting circuit 40 is a circuit for adjusting a current to flow gradually from the DC power source device 100 to the load 10 at insertion of the plug 11 in the plug receiver 20, and includes the MOSFET T1, resistors R2, R3, and a capacitor C2.

When the plug 11 is inserted to a position X3 in FIG. 12, the resistors R2, R3 and the capacitor C2 form a current integrating circuit. When the plug 11 is inserted to a position X2 in FIG. 12 after the plug 11 is inserted to the position X3 in FIG. 12, the current integrating circuit formed by the resistors R2, R3 and the capacitor C2 allows the current to flow gradually from the DC power source device 100 to the load 10.

Then, when the plug 11 is finally inserted to the position X1 in FIG. 12, the current flown by the current integrating circuit formed by the resistors R2, R3 and the capacitor C2 is reduced to reduce the gate voltage of the MOSFET T1, so that the MOSFET T1 is brought into the off state. With the MOSFET T1 brought into the off state, a shunt current no longer flows in the current limiting circuit 40, and thus, the DC power source device 100 shown in FIG. 12 can supply power efficiently from the DC power source device 100 to the load 10.

Therefore, the DC power source device 100 shown in FIG. 12 can suppress occurrence of a spark (thermal arc) when the plug 11 is inserted in the plug receiver 20 with the current limiting circuit 40 allowing the current to flow gradually from the DC power source device 100 to the load 10 when the plug 11 is inserted in the plug receiver 20.

Here, by combining the current limiting circuit 30 shown in FIG. 3 and the like with the current limiting circuit 40 shown in FIG. 12, occurrence of a spark (thermal arc) when the plug 11 is inserted in the plug receiver 20 and occurrence of an arc discharge at removal of the plug 11 from the plug receiver 20 can be suppressed together. An example of the case where the current limiting circuit 30 shown in FIG. 3 and the like and the current limiting circuit 40 shown in FIG. 12 are combined will be described.

Figure 13:
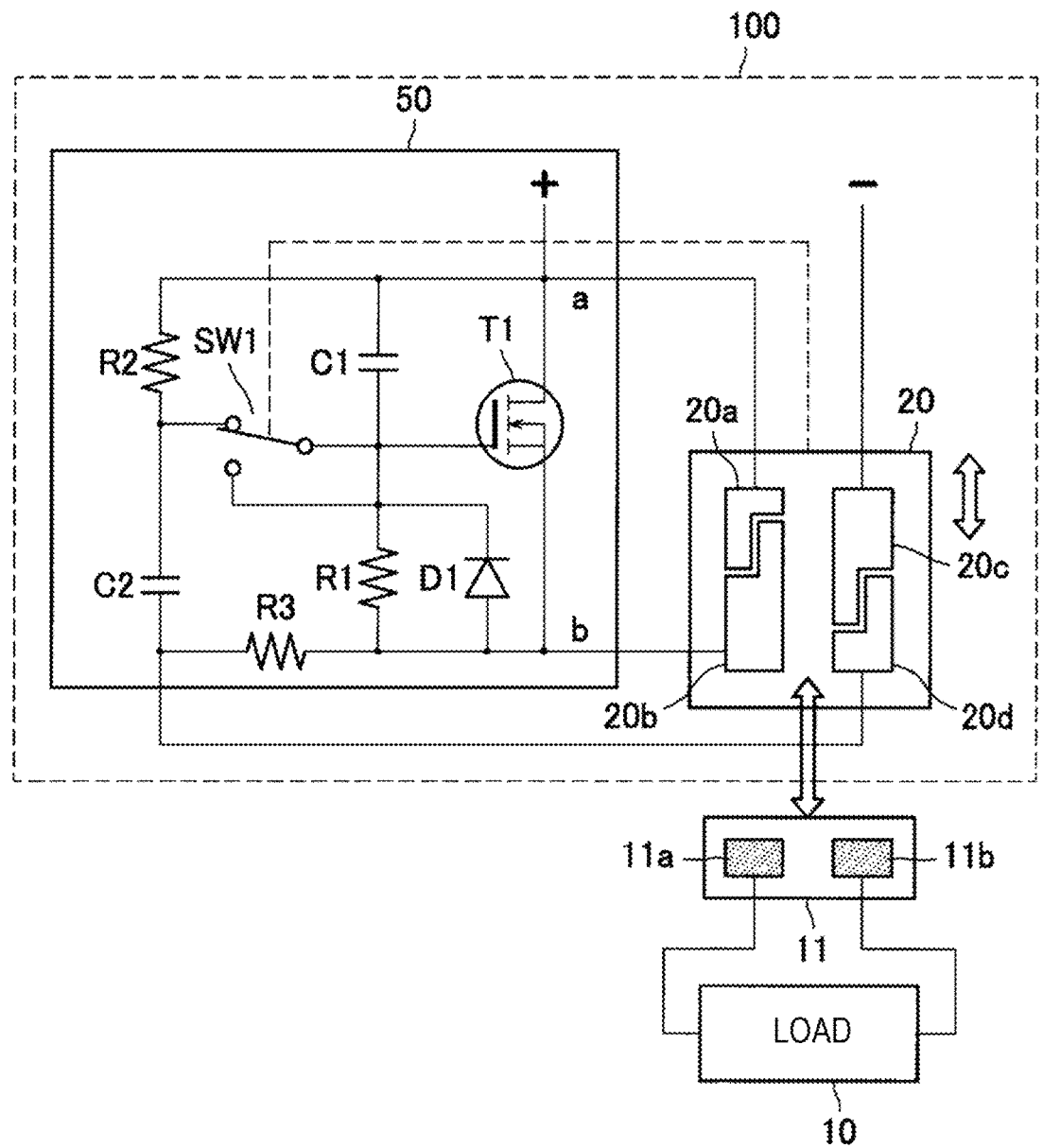
FIG. 13 is an explanatory diagram showing an exemplary configuration of the DC power source device 100 according to an embodiment of the present disclosure.

FIG. 13 is an explanatory diagram showing an exemplary configuration of the DC power source device 100 according to an embodiment of the present disclosure. The DC power source device 100 shown in FIG. 13 includes a current limiting circuit 50 for suppressing occurrence of a spark (thermal arc) when the plug 11 is inserted in the plug receiver 20 and occurrence of an arc discharge at removal of the plug 11 from the plug receiver 20. Moreover, the plug receiver 20 shown in FIG. 13 is provided with two contact elements 20c and 20d on the negative electrode side as well.

The current limiting circuit 50 is a circuit in which the current limiting circuit 30 shown in FIG. 3 and the like and the current limiting circuit 40 shown in FIG. 12 are combined. That is, the current limiting circuit 50 is a circuit for functioning in such a manner that a current flows gradually from the DC power source device 100 to the load 10 at insertion of the plug 11 in the plug receiver 20, and is also a circuit for functioning in such a manner that the current gradually decreases from the DC power source device 100 to the load 10 at removal of the plug 11 from the plug receiver 20.

The current limiting circuit 50 includes the MOSFET T1, the resistors R1, R2, R3, the capacitors C1, C2, the diode D1, and a switch SW1. The switch SW1 is a switch of such a structure that the gate terminal of the MOSFET T1 connects to the resistor R2 at insertion of the plug 11 in the plug receiver 20 and the gate terminal of the MOSFET T1 connects to the resistor R1 at removal of the plug 11 from the plug receiver 20.

When insertion of the plug 11 in the plug receiver 20 is started, the switch SW1 performs a switching operation toward connecting the gate terminal of the MOSFET T1 to the resistor R2 in accordance with a friction force or the like according to insertion of the plug 11 in the plug receiver 20, and conversely, when removal of the plug 11 from the plug receiver 20 is started, performs a switching operation toward connecting the gate terminal of the MOSFET T1 to the resistor R1 in accordance with a friction force or the like according to insertion of the plug 11 in the plug receiver 20.

With the switch SW1 shown in FIG. 13 performing the switching operations as described above, the current limiting circuit 50 functions in such a manner that the current flows gradually from the DC power source device 100 to the load 10 at insertion of the plug 11 in the plug receiver 20, and also functions in such a manner that the current flows gradually from the DC power source device 100 to the load 10 at removal of the plug 11 from the plug receiver 20.

Figure 14:
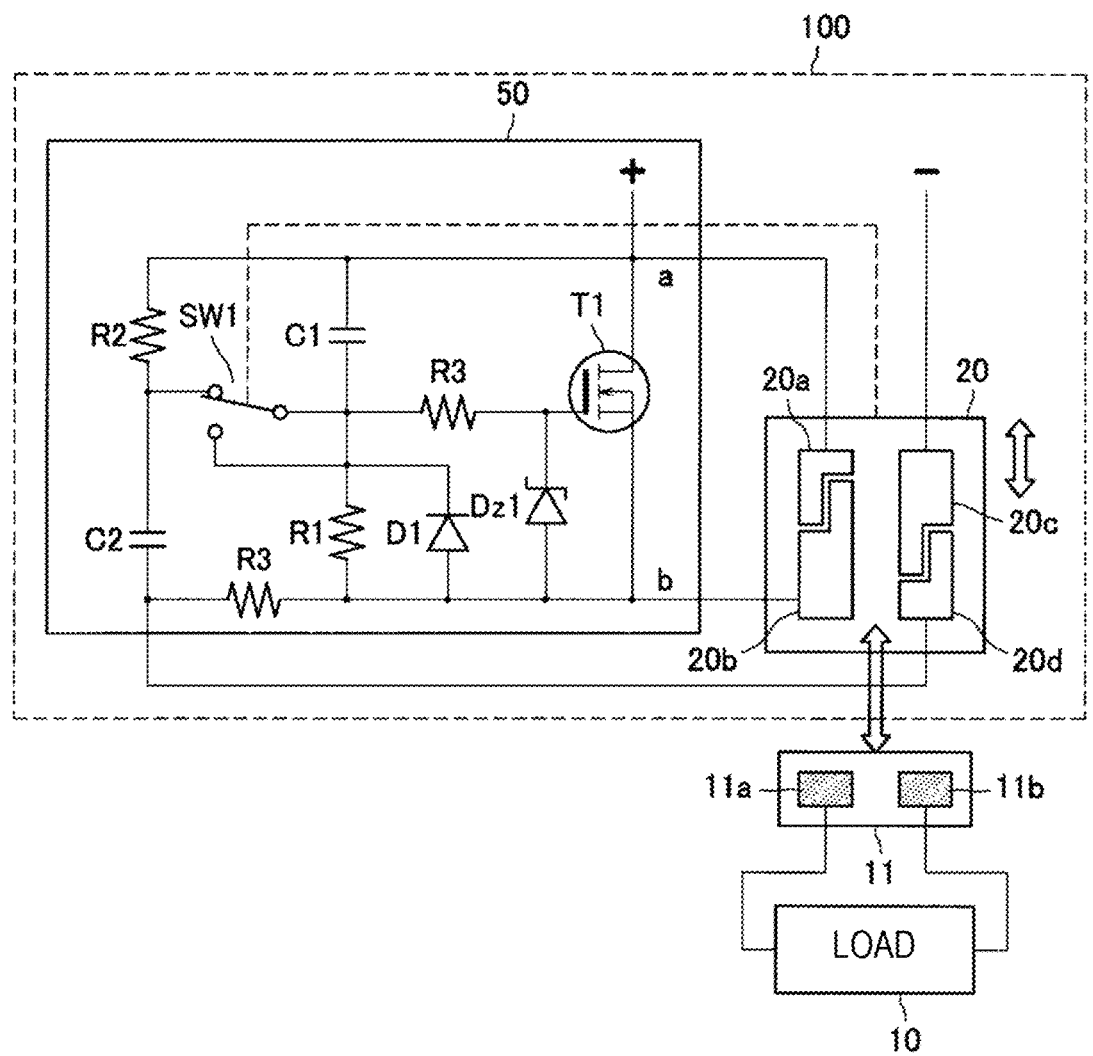
FIG. 14 is an explanatory diagram showing an exemplary configuration of the DC power source device 100 according to an embodiment of the present disclosure.

Note that, as shown in FIG. 14, the current limiting circuit 50 may be provided with a resistor R3 for protecting the MOSFET T1 on the gate terminal side, and may be provided with a Zener diode Dz1 also for protecting the MOSFET T1 between the gate terminal and the source terminal of the MOSFET T1.

The example of the case where DC power feeding is performed by the touch between two terminals and electrodes, that is, the case where the plug 11 of the load 10 has two terminals, has been described so far, whilst the present disclosure is not limited to such an example. In a case where DC power feeding is performed by the touch between three or more terminals and electrodes, occurrence of an arc discharge or a spark (thermal arc) can also be suppressed similarly by a current limiting circuit. That is, the plug of the load 10 and the electrodes of the DC power source device 100 may have three or more terminals.

Figure 15:
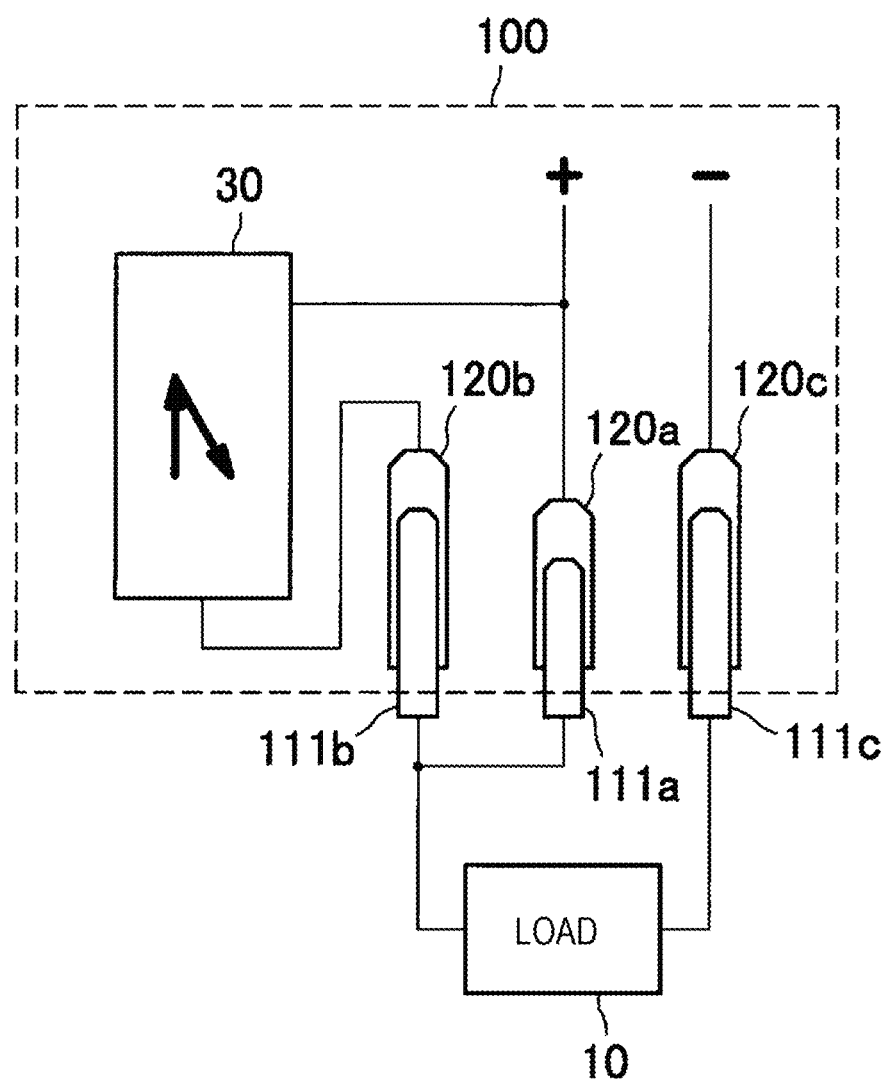
FIG. 15 is an explanatory diagram showing an exemplary configuration of the DC power source device 100 according to an embodiment of the present disclosure.

FIG. 15 is an explanatory diagram showing an exemplary configuration of the DC power source device 100 according to an embodiment of the present disclosure. Shown in FIG. 15 is an exemplary configuration of the DC power source device 100 that performs DC power feeding via three terminals. The DC power source device 100 shown in FIG. 15 includes electrodes 120a, 120b and 120c in which terminals 111a, 111b and 111c of the plug are inserted respectively.

When inserting the terminals 111a, 111b and 111c of the plug in the electrodes 120a, 120b and 120c, the terminals 111b and 111c first touch the electrodes 120b and 120c substantially simultaneously, and after the terminals 111b and 111c touch the electrodes 120b and 120c substantially simultaneously, the terminal 111a touches the electrode 120a.

Then, when removing the terminals 111a, 111b and 111c of the plug from the electrodes 120a, 120b and 120c, the terminal 111a is first separated from the electrode 120a, and after the terminal 111a is separated from the electrode 120a, the terminals 111b and 111c are separated from the electrodes 120b and 120c substantially simultaneously. Then, with the terminal 111a separated from the electrode 120a, the current limiting circuit 30 starts functioning in such a manner that the current decreases gradually from the DC power source device 100 to the load 10.

Figure 16:
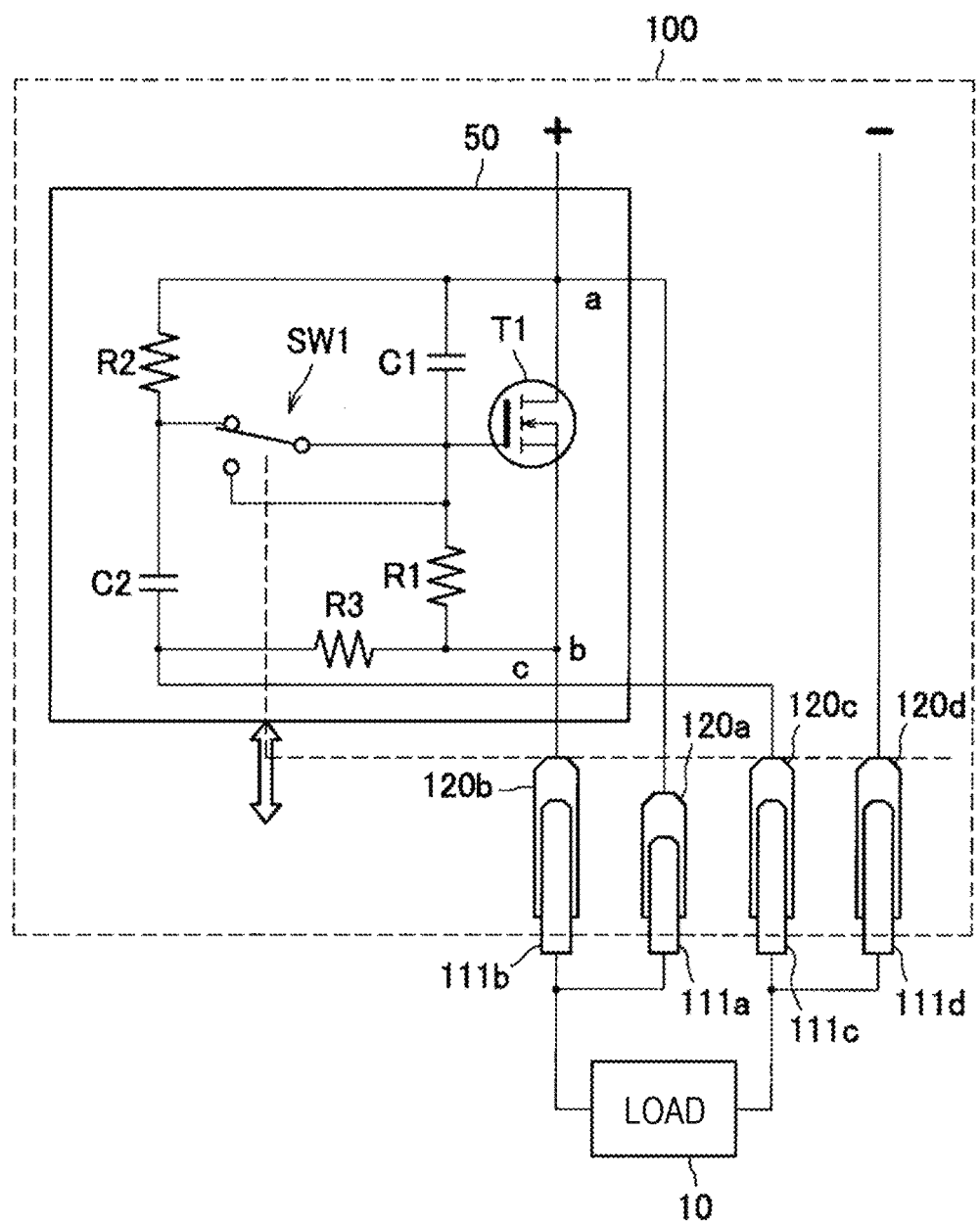
FIG. 16 is an explanatory diagram showing an exemplary configuration of the DC power source device 100 according to an embodiment of the present disclosure.

FIG. 16 is an explanatory diagram showing an exemplary configuration of the DC power source device 100 according to an embodiment of the present disclosure. Shown in FIG. 16 is an exemplary configuration of the DC power source device 100 that performs DC power feeding via four terminals. The DC power source device 100 shown in FIG. 16 includes the electrodes 120a, 120b, 120c, and 120d in which the terminals 111a, 111b, 111c, and 111d of the plug are inserted respectively.

When inserting the terminals 111a, 111b, 111c, and 111d of the plug in the electrodes 120a, 120b, 120c, and 120d, the terminals 111b, 111c and 111d first touch the electrodes 120b, 120c and 120d substantially simultaneously, and after the terminals 111b, 111c and 111d touch the electrodes 120b, 120c and 120d substantially simultaneously, the terminal 111a touches the electrode 120a. With the terminal 111a touching the electrode 120a sent from the other terminals 111b, 111c and 111d, the current limiting circuit 50 starts functioning in such a manner that the current flows gradually from the DC power source device 100 to the load 10.

Then, when removing the terminals 111a, 111b, 111c, and 111d of the plug from the electrodes 120a, 120b, 120c and 120d, the terminal 111a is first separated from the electrode 120a, and after the terminal 111a is separated from the electrode 120a, the terminals 111b, 111c and 111d are separated from the electrodes 120b, 120c and 120d substantially simultaneously. Then, with the terminal 111a separated from the electrode 120a, the current limiting circuit 50 starts functioning in such a manner that the current decreases gradually from the DC power source device 100 to the load 10.

As described above, in the case where DC power feeding is performed by the touch between three or more terminals and electrodes, the DC power source device 100 can also suppress occurrence of an arc discharge or a spark (thermal arc) by the current limiting circuit similarly to the case where DC power feeding is performed by the touch between two terminals and electrodes.

Figure 17:
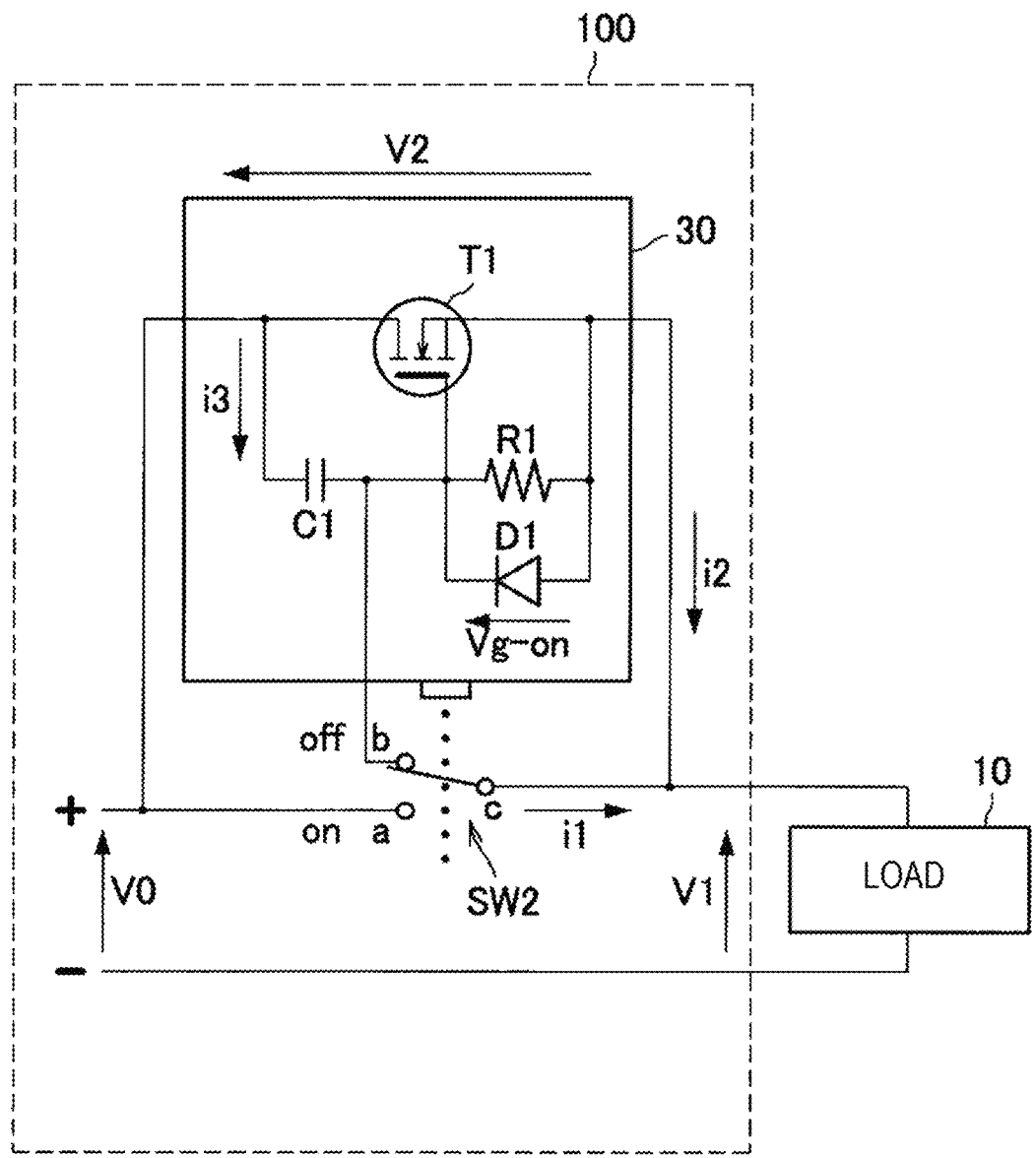
FIG. 17 is an explanatory diagram showing an exemplary configuration of the DC power source device 100 according to an embodiment of the present disclosure.

FIG. 17 is an explanatory diagram showing an exemplary configuration of the DC power source device 100 according to an embodiment of the present disclosure. Shown in FIG. 17 is an exemplary configuration of the DC power source device 100 in which a single-pole double-throw switch SW2 is used when disconnecting the load 10 from the DC power source device 100. The example shown in FIG. 17 is characterized in that a b-contact of the single-pole double-throw switch SW2 is connected to a node between the capacitor C1 and the resistor R1 of the current limiting circuit 30. Even in the case of using the single-pole double-throw switch SW2 when disconnecting the load 10 from the DC power source device 100, occurrence of an arc discharge or a spark (thermal arc) can be suppressed by the current limiting circuit 30.

Figure 18:
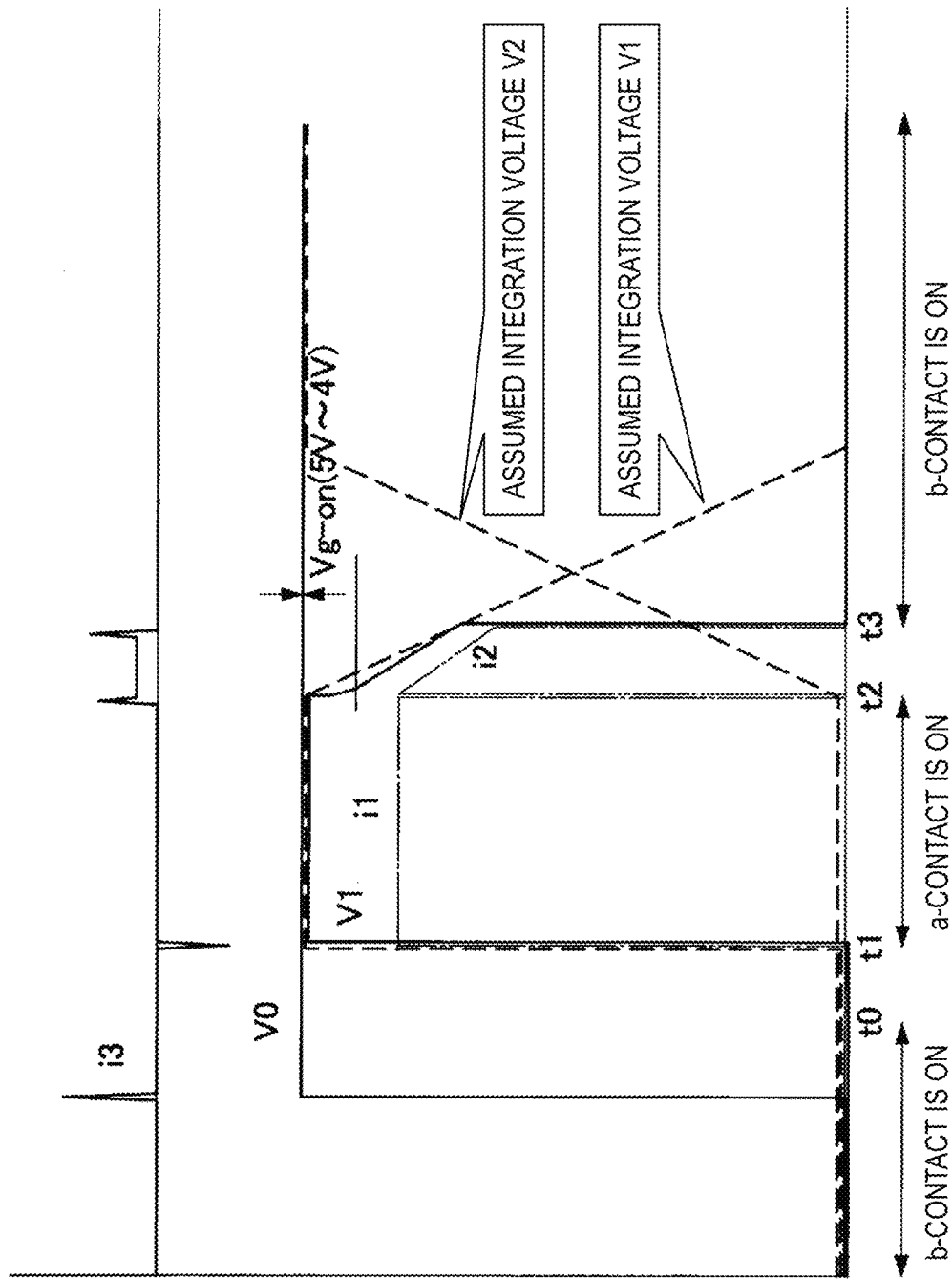
FIG. 18 is an explanatory diagram showing exemplary transitions of currents and voltages in the exemplary configuration of the DC power source device 100 shown in FIG. 17.

FIG. 18 is an explanatory diagram showing exemplary transitions of currents and voltages in the exemplary configuration of the DC power source device 100 shown in FIG. 17.

When a voltage is applied to the DC power source device 100 in the power off state where DC power feeding from the DC power source device 100 to the load 10 is not performed, that is, in the state where the single-pole double-throw switch SW2 is connected to the b-contact, the voltage V2 is applied to the capacitor C1, and a charging current flows. In a case where the capacitor C1 has a capacitance of approximately 0.1 µF, a microcurrent directly flows in the load 10, and the MOSFET T1 remains in the off state. Therefore, a large current does not flow from the DC power source device 100 to the load 10 since the MOSFET T1 is in the off state.

When the single-pole double-throw switch SW2 is pressed at a point of time t1 in FIG. 18 to connect a conducting plate to an a-contact, a voltage V0 of the DC power source device 100 is completely applied to the load 10. When the voltage V0 and the voltage V1 of the load 10 reach an equivalent value, the current limiting circuit 30 is brought into the short-circuit state. When the current limiting circuit 30 is brought into the short-circuit state, charges accumulated in the capacitor C1 are discharged rapidly via the diode D1.

When the single-pole double-throw switch SW2 is pressed at a point of time t2 in FIG. 18 to release the connection between the conducting plate and the a-contact, the voltage V2 which is the drain-source voltage of the MOSFET T1 starts to rise, and a current i3 flows in the capacitor C1. The flow of the current i3 in the capacitor C1 produces a voltage in the resistor R1, and when a gate voltage Vg of the MOSFET T1 rises to Vg-on, the MOSFET T1 is turned on. When the MOSFET T1 is turned on, the charging voltage of the capacitor C1 rises gradually, while the current i2 flowing from the DC power source device 100 to the load 10 decreases.

When the switching operation of the single-pole double-throw switch SW2 ends, the conducting plate of the single-pole double-throw switch SW2 and the b-contact are connected at a point of time t3 in FIG. 18. The gate voltage Vg of the MOSFET T1 reaches 0V, and the current i2 flowing from the DC power source device 100 to the load 10 is interrupted.

By the above-described series of operations, the DC power source device 100 shown in FIG. 17 prevents the current limiting circuit 30 from operating when the voltage V0 of the DC power source device 100 is applied to the load 10 as an initial state. Moreover, when in the off operation of the single-pole double-throw switch SW2, the DC power source device 100 shown in FIG. 17 can ensure a distance that an arc discharge does not occur even if the conducting plate is separated sufficiently from the contact a and is separated even to the contact b, and suspends the operation of the current limiting circuit 30 to reduce unnecessary power consumption, and reduces heat generation of the MOSFET T1 which is a switching element.

The above-described series of operations similarly apply to the exemplary configuration shown in FIG. 9 in which the DC power source device 100 is provided with the DC relay 31, and start and stop of DC power feeding from the DC power source device 100 is performed by the DC relay 31.

Figure 19:
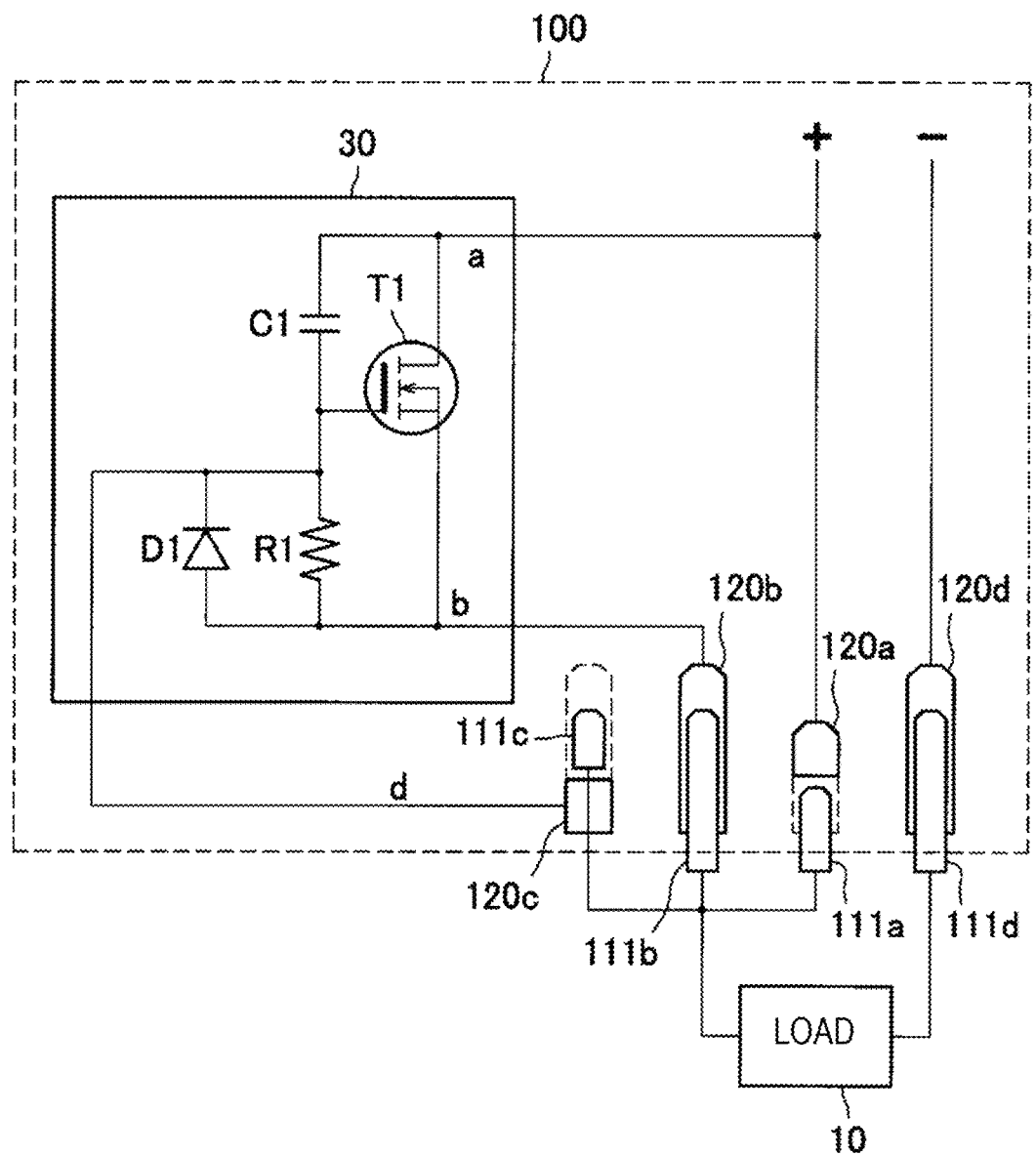
FIG. 19 is an explanatory diagram showing an exemplary configuration of the DC power source device 100 according to an embodiment of the present disclosure.

FIG. 19 is an explanatory diagram showing an exemplary configuration of the DC power source device 100 according to an embodiment of the present disclosure. Shown in FIG. 19 is an exemplary configuration of the DC power source device 100 that performs DC power feeding via four terminals. The DC power source device 100 shown in FIG. 19 includes the electrodes 120a, 120b, 120c and 120d in which the terminals 111a, 111b, 111c, and 111d of the plug are inserted respectively.

When inserting the terminals 111a, 111b, 111c, and 111d of the plug in the electrodes 120a, 120b, 120c, and 120d, the terminals 111b, 111c and 111d first touch the electrodes 120b, 120c and 120d substantially simultaneously, and after the terminals 111b, 111c and 111d touch the electrodes 120b, 120c and 120d substantially simultaneously, the terminal 111a touches the electrode 120a.

Then, when removing the terminals 111a, 111b, 111c, and 111d of the plug from the electrodes 120a, 120b, 120c and 120d, the terminal 111a is first separated from the electrode 120a, and after the terminal 111a is separated from the electrode 120a, the terminals 111b, 111c and 111d are separated from the electrodes 120b, 120c and 120d substantially simultaneously. Then, with the terminal 111a separated from the electrode 120a, the current limiting circuit 30 starts functioning in such a manner that the current decreases gradually from the DC power source device 100 to the load 10.

In the example shown in FIG. 19, the terminals 111a and 111c of the plug do not touch the electrodes 120a and 120c simultaneously. The leading position and the rear end position of the terminals are different between the terminals 111a and 111c of the plug, and moreover, the position of the electrodes 120a and 120c is also located such that the terminals 111a and 111c of the plug do not touch the electrodes 120a and 120c simultaneously.

By providing the terminals 111a, 111b, 111c, and 111d of the plug and the electrodes 120a, 120b, 120c and 120d as shown in FIG. 19, occurrence of an arc discharge or a spark (thermal arc) can also be suppressed by the current limiting circuit 30.

Figure 20:
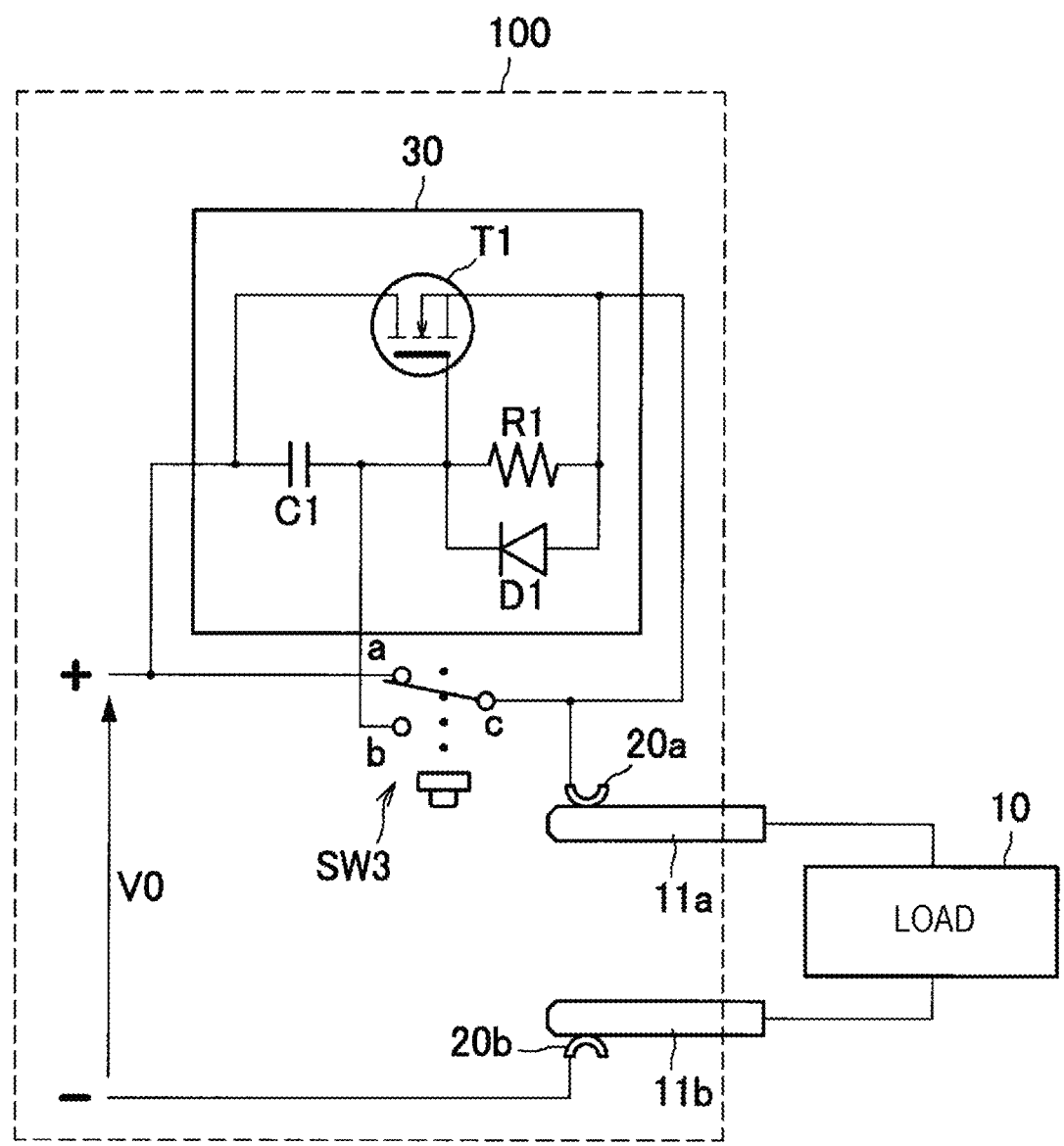
FIG. 20 is an explanatory diagram showing an exemplary configuration of the DC power source device 100 according to an embodiment of the present disclosure.

FIG. 20 is an explanatory diagram showing an exemplary configuration of the DC power source device 100 according to an embodiment of the present disclosure. Shown in FIG. 20 is an exemplary configuration of the DC power source device 100 in which a switch SW3 is used when disconnecting the load 10 from the DC power source device 100. FIG. 20 shows a configuration in which a conducting plate of the switch SW3 is switched between the contact a and the contact b by a touch between the terminal 11a of the plug and the switch SW3. Moreover, the example shown in FIG. 20 is characterized in that the b-contact of the switch SW3 is connected to a node between the capacitor C1 and the resistor R1 of the current limiting circuit 30.

When inserting the plug in the DC power source device 100, the contact element 20a and the contact element 20b touch the terminal 11a and the terminal 11b, respectively. Moreover, when inserting the plug in the DC power source device 100, the touch between the contact element 20a and the terminal 11a allows a microcurrent to flow in the capacitor C1 via the b-contact of the switch SW3, and the capacitor C1 is charged.

Thereafter, the plug is further inserted in the DC power source device 100, and the conducting plate of the switch SW3 is switched from the contact b to the contact a by the touch with the terminal 11a. When the conducting plate of the switch SW3 is switched to the contact a, DC power from the DC power source device 100 is supplied to the load 10 via the contact a. Moreover, when the conducting plate of the switch SW3 is switched to the contact a, charges accumulated in the capacitor C1 are discharged rapidly via the diode D1.

When the plug is removed from the DC power source device 100, the conducting plate of the switch SW3 is first switched from the contact a to the contact b by releasing the touch with the terminal 11b. When the conducting plate of the switch SW3 is disconnected from the contact a, the current limiting circuit 30 operates to bypass the current from the DC power source device 100 to the current limiting circuit 30, thereby suppressing occurrence of an arc discharge.

Then, when the conducting plate of the switch SW3 is connected to the contact b, the gate voltage of the MOSFET T1 drops to bring the MOSFET T1 into the off state. With the MOSFET T1 brought into the off state, the current flowing from the DC power source device 100 to the load 10 becomes zero.

Figure 21:
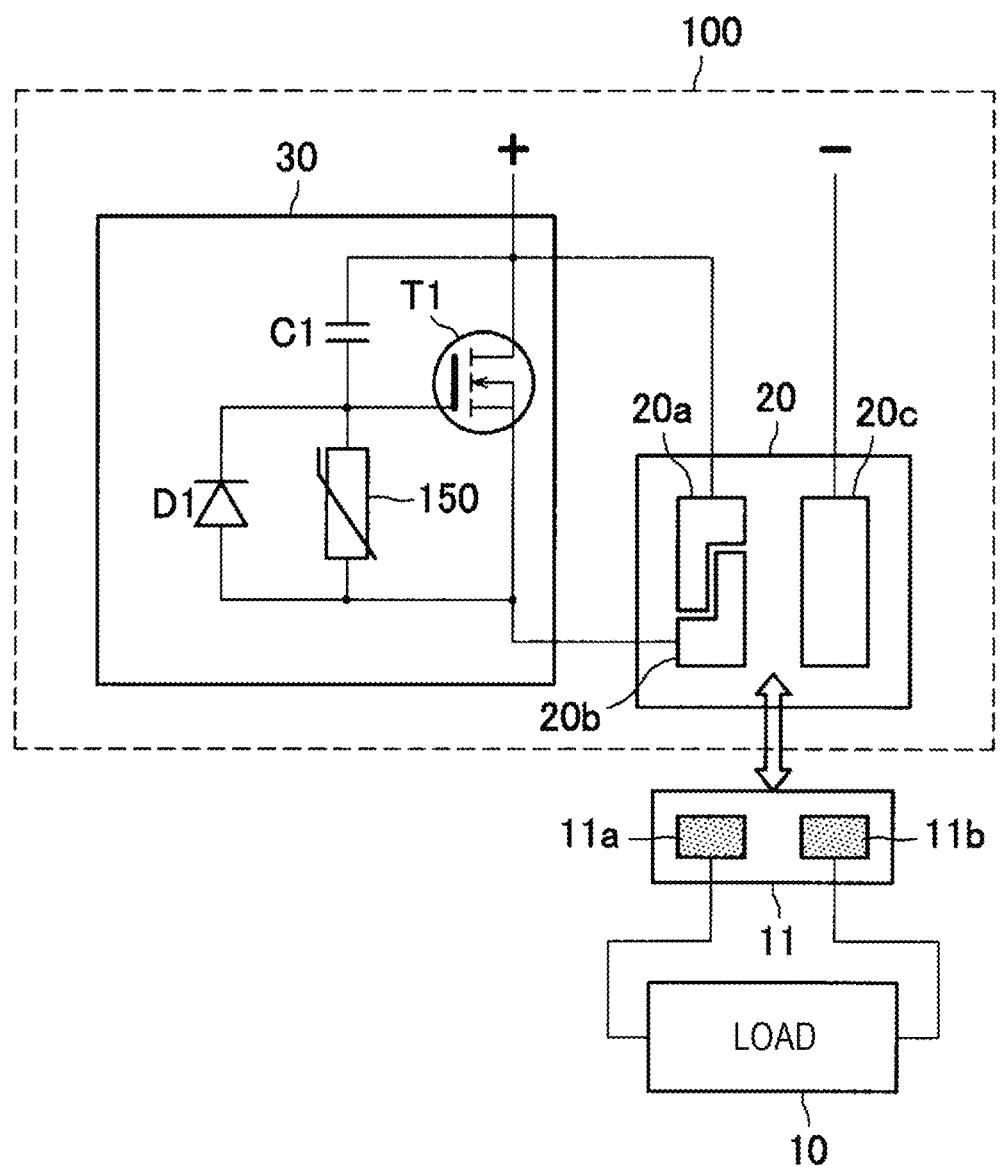
FIG. 21 is an explanatory diagram showing an exemplary configuration of the DC power source device 100 according to an embodiment of the present disclosure.

FIG. 21 is an explanatory diagram showing an exemplary configuration of the DC power source device 100 according to an embodiment of the present disclosure. Shown in FIG. 21 is an exemplary configuration of the DC power source device 100 including the current limiting circuit 30 in which a thermistor 150 is used instead of the resistor R1.

The thermistor 150 is a negative temperature coefficient (NTC) thermistor whose resistance value is inversely proportional to temperature. The current limiting circuit 30 shown in FIG. 21 shortens the charging time for the capacitor C1 using the effect that the thermistor 150 generates heat on its own by the current flowing into the thermistor 150 which is an NTC thermistor and the resistance value at room temperature suddenly decreases.

The current limiting circuit 30 shown in FIG. 21 can shorten the charging time for the capacitor C1, thereby shortening the operating time of the MOSFET T1. Moreover, the current limiting circuit 30 shown in FIG. 21 can shorten the charging time for the capacitor C1 utilizing the changes in resistance caused by self-heating of the thermistor 150 which is an NTC thermistor, and can suppress the arc discharge condition while reducing heat generation due to power consumption of the MOSFET T1 irrespective of a difference in source voltage of DC power sources.

Figure 22:
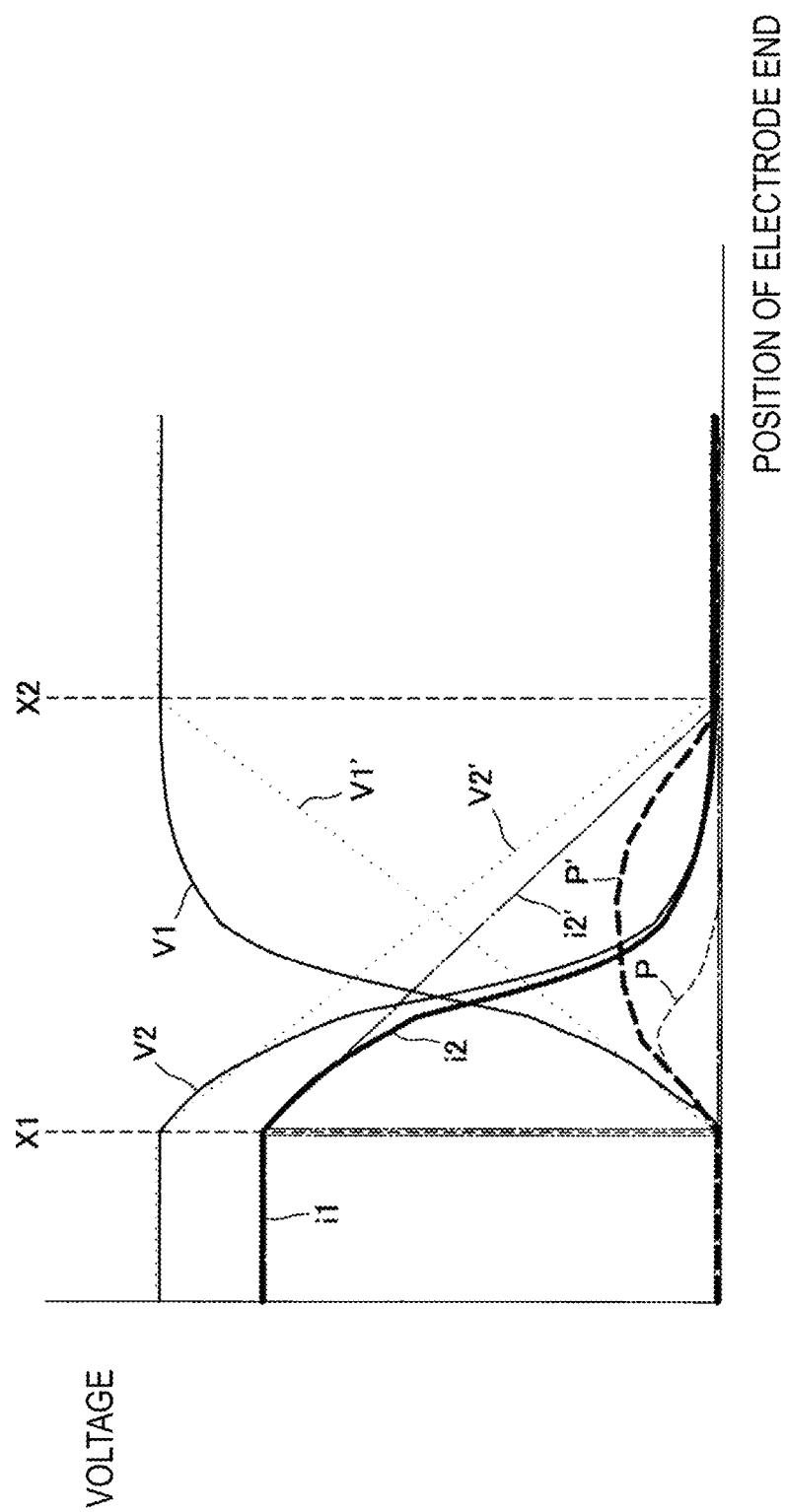
FIG. 22 is an explanatory diagram showing voltage changes of the end-to-end voltage V1 of the current limiting circuit 30 and voltage changes of the voltage V2 applied to the load 10 in relation to the place where the plug 11 is inserted.

FIG. 22 is an explanatory diagram showing an example of voltage changes of the end-to-end voltage V1 of the current limiting circuit 30 and voltage changes of the voltage V2 applied to the load 10 in relation to the place where the plug 11 is inserted in the power control device 100 shown in FIG. 21. Moreover, FIG. 22 also shows an example of current changes of the current i1 flowing to the contact element 20a side and the current i2 flowing to the contact element 20b side in relation to the place where the plug 11 is inserted. Note that the voltages V1, V2 and the currents i1, i2 in the graph of voltage changes shown in FIG. 7 are indicated in FIG. 22 by broken lines as pressures V1', V2' and currents i1', i2', respectively.

In the current limiting circuit 30 shown in FIG. 21, the voltages V1, V2 and the currents i1, i2 change as in the graph shown in FIG. 22 through the use of the thermistor 150 which is an NTC thermistor. The current limiting circuit 30 shown in FIG. 21 can shorten the operating time of the MOSFET T1 irrespective of a difference in source voltage by shortening the charging time for the capacitor C1 and can suppress occurrence of an arc discharge while reducing heat generation due to power consumption of the MOSFET T1.

FIG. 22 also shows transitions of consumption power P of the MOSFET T1 in relation to the place where the plug 11 is inserted. With the voltages V1, V2 and the currents i1, i2 changing as in the graph shown in FIG. 22, the consumption power P of the MOSFET T1 also changes from P' to P. That is, the current limiting circuit 30 shown in FIG. 21 can reduce the amount of power consumption of the MOSFET T1 through the use of the thermistor 150 which is an NTC thermistor.

Note that although the NTC thermistor is used for the thermistor 150 shown in FIG. 21, the effect of suppressing occurrence of an arc discharge while reducing heat generation due to power consumption of the MOSFET T1 can also be expected with a critical temperature resistor (CTR) thermistor in place of the NTC thermistor. The CTR thermistor is a thermistor whose resistance decreases suddenly when a certain temperature is exceeded, and the current limiting circuit 30 can also shorten the charging time for the capacitor C1 using the CTR thermistor in place of the NTC thermistor whose resistance value is inversely proportional to temperature.

Moreover, by combining a resistor or a positive temperature coefficient (PTC) thermistor in parallel with the thermistor 150 shown in FIG. 21 which is an NTC thermistor, variations in integration time depending on the operating environment temperature of the current limiting circuit 30 can also be suppressed. The PTC thermistor is a thermistor whose resistance rises suddenly when a certain temperature is exceeded contrarily to the CTR thermistor. By combining the NTC thermistor and the PTC thermistor in parallel, it is possible to prevent wide variations from occurring in the resistance value of the thermistors as a whole combined in parallel even if the operating environment temperature of the current limiting circuit 30 varies.

The current limiting circuit 30 shown in FIG. 21 can shorten the interruption time of the MOSFET T1 since the integration time is not proportional to voltage changes of the DC power source. Moreover, when performing DC interruption, even if the voltage of the DC power source becomes twice, consumption power of the MOSFET T1 will not increase in proportion to that voltage increase, and the DC limiting circuit 30 shown in FIG. 21 can reduce heat dissipation of the MOSFET T1.

Figure 23:
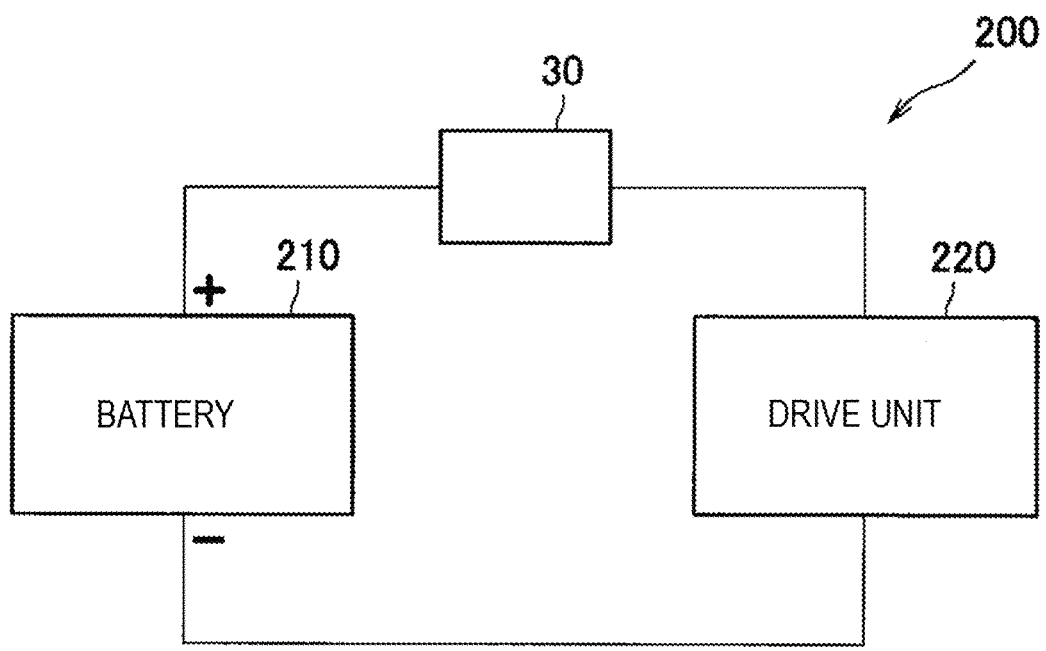
FIG. 23 is an explanatory diagram showing an exemplary functional configuration of an electric driven member provided with the current limiting circuit 30 according to an embodiment of the present disclosure.

FIG. 23 is an explanatory diagram showing an exemplary functional configuration of a movable body 200 including the current limiting circuit 30. For example, the movable body 200 may be a movable body powered by gasoline, such as a gasoline vehicle, or may be a movable body mainly powered by a chargeable and dischargeable battery, such as an electric vehicle, a hybrid vehicle, or an electric motorcycle. FIG. 23 shows an example of a case where the movable body 200 is provided with a battery 210 and a drive unit 220 driven by power supplied from the battery. The drive unit 220 may include, for example, equipment provided for a vehicle, such as a wiper, a power window, a light, a car navigation system, and an air conditioner, a device that drives the movable body 200, such as a motor, and the like.

The movable body 200 shown in FIG. 23 is provided with the current limiting circuit 30 on the way of a path along which DC power is supplied from the battery 210 to the drive unit 220. With the current limiting circuit 30 provided on the path along which DC power is supplied from the battery 210 to the drive unit 220, the movable body 200 shown in FIG. 23 can suppress occurrence of an arc discharge when temporarily attaching/detaching the battery 210, for example.

Note that FIG. 23 shows an example of the movable body 200 provided with only one current limiting circuit 30, whilst the present disclosure is not limited to such an example. That is, a plurality of current limiting circuits 30 may be provided on the way of the path along which DC power is supplied. Moreover, not only on the way of the path along which DC power is supplied from the battery 210 to the drive unit 220, the current limiting circuit 30 may also be provided at another place, for example, on the way of a path when charging the battery 210 with DC power. With the current limiting circuit 30 provided on the way of the path when charging the battery 210 with DC power, the movable body 200 can allow the battery 210 to be charged with the DC power safely.

2. Conclusion

According to an embodiment of the present disclosure as described above, the DC power source device 100 is provided which includes the current limiting circuit 30 that can function in the direction that a current flowing from the DC power source device 100 to the load 10 is gradually reduced when the plug 11 is removed from the DC power source device 100 while DC power feeding is performed from the DC power source device 100 to the load 10, and can suppress occurrence of an arc discharge when the plug 11 is removed from the DC power source device 100.

No current flows in the current limiting circuit 30 in the state where the plug 11 has been completely inserted in the DC power source device 100. The current limiting circuit 30 will not consume power while DC power feeding is performed from the DC power source device 100 to the load 10 since no current flows in the state where the plug 11 has been completely inserted in the DC power source device 100, and thus will not reduce power supply efficiency.

Then, the current limiting circuit 30 accumulates charges in the capacitor C1 by the current produced by the potential difference generated between the drain and the source of the MOSFET T1 when the plug 11 is removed from the DC power source device 100, and raises the gate voltage of the MOSFET T1 in accordance with the accumulation of charges in the capacitor C1 to turn on the MOSFET T1.

With the MOSFET T1 turned on by the accumulation of charges in the capacitor C1 to flow the current from the DC power source device 100 to the load 10 through the MOSFET T1, the current limiting circuit 30 can inhibit occurrence of a potential difference from a contact element which an electrode of the plug 11 has been touching so far to suppress occurrence of an arc discharge when the plug 11 is removed from the DC power source device 100.

The plug 11 and the plug receiver 20 according to an embodiment of the present disclosure may be applied to a male connector and a female connector of a universal serial bus (USB), respectively. In a case where DC power is supplied from the female connector to the male connector of the USB, occurrence of an arc discharge when the male connector is removed from the female connector of the USB can be suppressed with the DC limiting circuit 30 according to an embodiment of the present disclosure provided in an apparatus including a USB port.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A current limiting circuit configured to:

before release of a touch between a second contact provided at a position where a terminal on a power receiving side in which a current flows at supply of DC power in an electrode that supplies the DC power touches before touching a first contact provided for the electrode at supply of the DC power and the terminal, decrease the current flowing into the terminal through the second contact; and avoid flowing a current in a case where the terminal is touching the first contact, and decrease the current flowing into the terminal through the second contact only in a case where the terminal is touching the second contact.

(2)

The current limiting circuit according to (1), configured to:

decrease a potential difference between a positive electrode and a negative electrode of an apparatus that receives the DC power by gradually increasing a potential difference between the first contact and the second contact to decrease the current flowing between the second contact and the terminal.

(3)

The current limiting circuit according to (2), including:

a switching element configured to be brought into an on state at a time point when the terminal is no longer connected to the first contact to decrease the current flowing into the terminal through the second contact in a state where the terminal is connected only to the second contact.

(4)

The current limiting circuit according to (3), including:

a capacitive element configured to start being charged at a time point when the terminal is no longer connected to the first contact to raise a gate voltage of the switching element in the state where the terminal is connected only to the second contact.

(5)

The current limiting circuit according to (4), including:

a resistive element configured to set a time for applying a voltage to a gate terminal of the switching element in conjunction with the capacitive element.

(6)

The current limiting circuit according to (5), in which the resistive element is an element whose resistance value drops with an increase in temperature.

(7)

The current limiting circuit according to any of (1) to (6), configured to:

gradually increase the current flowing into the terminal through the second contact when the terminal touches the second contact before touching the first contact.

(8)

The current limiting circuit according to (7), including:

a switch configured to switch functions between a case where the terminal touches the second contact before touching the first contact and a case where the terminal touches the second contact after touching the first contact.

(9)

A DC power supply connector at least including:

a positive-electrode-side electrode and a negative-electrode-side electrode configured to supply DC power, in which at least any of the positive-electrode-side electrode and the negative-electrode-side electrode includes a first contact, a second contact provided at a position where a terminal on a power receiving side in which a DC current flows at supply of the DC power touches before touching the first contact, and a current limiting circuit configured to decrease the current flowing into the terminal through the second contact before release of a touch between the terminal and the second contact, and the current limiting circuit does not flow a current in a case where the terminal is touching the first contact, and the current limiting circuit decreases the current flowing into the terminal through the second contact only in a case where the terminal is touching the second contact.

(10)

The DC power supply connector according to (9), in which the current limiting circuit decreases a potential difference between a positive electrode and a negative electrode of an apparatus that receives the DC power by gradually increasing a potential difference between the first contact and the second contact to decrease the current flowing between the second contact and the terminal.

(11)

The DC power supply connector according to (10), in which the current limiting circuit includes a switching element configured to be brought into an on state at a time point when the terminal is no longer connected to the first contact to decrease the current flowing into the terminal through the second contact in a state where the terminal is connected only to the second contact.

(12)

The DC power supply connector according to (11), in which the current limiting circuit includes a capacitive element configured to start being charged at a time point when the terminal is no longer connected to the first contact to raise a gate voltage of the switching element in the state where the terminal is connected only to the second contact.

(13)

The DC power supply connector according to (12), in which the current limiting circuit includes a resistive element configured to set a time for applying a voltage to a gate terminal of the switching element in conjunction with the capacitive element.

(14)

The current limiting connector according to (13), in which the resistive element is an element whose resistance value drops with an increase in temperature.

(15)
The DC power supply connector according to any of (9) to (14),
in which the current limiting circuit gradually increases the current flowing into the terminal through the second contact when the terminal touches the second contact before touching the first contact.

(16)
The current limiting connector according to (15),
in which the current limiting circuit includes a switch configured to switch functions between a case where the terminal touches the second contact before touching the first contact and a case where the terminal touches the second contact after touching the first contact.

(17)
A DC power source device at least including:
a DC power source configured to supply DC power; and
a positive-electrode-side electrode and a negative-electrode-side electrode configured to supply the DC power from the DC power source,
in which at least any of the positive-electrode-side electrode and the negative-electrode-side electrode includes
a first contact,
a second contact provided at a position where a terminal on a power receiving side in which a DC current flows at supply of the DC power touches before touching the first contact, and
a current limiting circuit configured to decrease the current flowing into the terminal through the second contact before release of a touch between the terminal and the second contact, and
the current limiting circuit does not flow a current in a case where the terminal is touching the first contact, and the current limiting circuit decreases the current flowing into the terminal through the second contact only in a case where the terminal is touching the second contact.

(18)
The DC power source device according to (17),
in which the current limiting circuit decreases a potential difference between a positive electrode and a negative electrode of an apparatus that receives the DC power by gradually increasing a potential difference between the first contact and the second contact to decrease the current flowing between the second contact and the terminal.

(19)
The DC power source device according to (18), including:
a switching element configured to be brought into an on state at a time point when the terminal is no longer connected to the first contact to decrease the current flowing into the terminal through the second contact in a state where the terminal is connected only to the second contact.

(20)
The DC power source device according to (19),
in which the current limiting circuit includes a capacitive element configured to start being charged at a time point when the terminal is no longer connected to the first contact to raise a gate voltage of the switching element in the state where the terminal is connected only to the second contact.

(21)
The DC power source device according to (20),
in which the current limiting circuit includes a resistive element configured to set a time for applying a voltage to a gate terminal of the switching element in conjunction with the capacitive element.

(22)
The DC power source device according to (21),
in which the resistive element is an element whose resistance value drops with an increase in temperature.

(23)
The DC power source device according to any of (17) to (22),
in which the current limiting circuit gradually increases the current flowing into the terminal through the second contact when the terminal touches the second contact before touching the first contact.

(24)
The DC power source device according to (23),
in which the current limiting circuit includes a switch configured to switch functions between a case where the terminal touches the second contact before touching the first contact and a case where the terminal touches the second contact after touching the first contact.

(25)
A current limiting circuit including:
a switching element configured to be brought into an on state at a time point when a terminal that receives supply of DC power is no longer connected to a drain-side contact to, in a state where the terminal is connected only to a source-side contact, decrease a current flowing into the terminal through the source-side contact;
a capacitive element configured to start being charged at a time point when the terminal is no longer connected to the drain-side contact to raise a gate voltage of the switching element in the state where the terminal is connected only to the source-side contact; and
a resistive element configured to set a time for applying a voltage to a gate terminal of the switching element in conjunction with the capacitive element.

(26)
The current limiting circuit according to (25), configured to:
decrease a potential difference between a positive electrode and a negative electrode of an apparatus that receives the DC power by gradually increasing a potential difference between the drain-side contact and the source-side contact to decrease the current flowing between the source-side contact and the terminal.

(27)
The current limiting circuit according to (25) or (26),
in which the resistive element is an element whose resistance value drops with an increase in temperature.

(28)
The current limiting circuit according to any of (25) to (27), configured to:
gradually increase the current flowing into the terminal through the source-side contact when the terminal touches the source-side contact before touching the drain-side contact.

(29)
The current limiting circuit according to (28), including:
a switch configured to switch functions between a case where the terminal touches the source-side contact before touching the drain-side contact and a case where the terminal touches the source-side contact after touching the drain-side contact.

(30)
A movable body including the current limiting circuit according to any of (1) to (8).

(31)
  A power supply system including:
    a battery configured to supply DC power;
    a drive unit configured to be driven by the DC power supplied from the battery; and
    at least one current limiting circuit according to claim 1 that is provided between the battery and the drive unit.
(32)
  The power supply system according to (31),
    in which the power supply system is provided for a movable body.
(33)
  The power supply system according to (31) or (32),
    in which the current limiting circuit decreases a potential difference between a positive electrode and a negative electrode of an apparatus that receives the DC power by gradually increasing a potential difference between the first contact and the second contact to decrease the current flowing between the second contact and the terminal.
(34)
  The power supply system according to (33), including:
    a switching element configured to be brought into an on state at a time point when the terminal is no longer connected to the first contact to decrease the current flowing into the terminal through the second contact in a state where the terminal is connected only to the second contact.
(35)
  The power supply system according to (34),
    in which the current limiting circuit includes a capacitive element configured to start being charged at a time point when the terminal is no longer connected to the first contact to raise a gate voltage of the switching element in the state where the terminal is connected only to the second contact.
(36)
  The power supply system according to (35),
    in which the current limiting circuit includes a resistive element configured to set a time for applying a voltage to a gate terminal of the switching element in conjunction with the capacitive element.
(37)
  The power supply system according to (36),
    in which the resistive element is an element whose resistance value drops with an increase in temperature.
(38)
  The power supply system according to any of (31) to (37),
    in which the current limiting circuit gradually increases the current flowing into the terminal through the second contact when the terminal touches the second contact before touching the first contact.
(39)
  The power supply system according to (38),
    in which the current limiting circuit includes a switch configured to switch functions between a case where the terminal touches the second contact before touching the first contact and a case where the terminal touches the second contact after touching the first contact.

REFERENCE SIGNS LIST

1 DC power supply system
10 load
11 plug
11a positive-electrode-side terminal
11b negative-electrode-side terminal
11c positive-electrode-side terminal
11d negative-electrode-side terminal
20 plug receiver
20a, 20b, 20c, 20d, 20e, 20f, 21a, 21b contact element
22 switch
22a, 22b terminal
30, 40, 50 current limiting circuit
31 DC relay
100, 100a, 100b DC power source device
111a, 111b, 111c, 111d terminal
120a, 120b, 120c, 120d electrode
200 movable body
210 battery
220 drive unit

The invention claimed is:
1. A current limiting circuit configured to:
  before release of a touch between a second contact and a terminal on a power receiving side in which a current flows at supply of DC power in an electrode that supplies the DC power, wherein the second contact is provided at a position where the terminal touches before touching a first contact, wherein the first contact is provided for the electrode at supply of the DC power and the terminal, decrease the current flowing into the terminal through the second contact;
  avoid flowing a current in a case where the terminal is touching the first contact, and decrease the current flowing into the terminal through the second contact only in a case where the terminal is touching the second contact; and
  gradually increase the current flowing into the terminal through the second contact when the terminal touches the second contact before touching the first contact.
2. The current limiting circuit according to claim 1, configured to:
  decrease a potential difference between a positive electrode and a negative electrode of an apparatus that receives the DC power by gradually increasing a potential difference between the first contact and the second contact to decrease the current flowing between the second contact and the terminal.
3. The current limiting circuit according to claim 2, comprising:
  a switching element configured to be brought into an on state at a time point when the terminal is no longer connected to the first contact to decrease the current flowing into the terminal through the second contact in a state where the terminal is connected only to the second contact.
4. The current limiting circuit according to claim 3, comprising:
  a capacitive element configured to start being charged at a time point when the terminal is no longer connected to the first contact to raise a gate voltage of the switching element in the state where the terminal is connected only to the second contact.
5. The current limiting circuit according to claim 4, comprising:
  a resistive element configured to set a time for applying a voltage to a gate terminal of the switching element in conjunction with the capacitive element.
6. The current limiting circuit according to claim 5, wherein the resistive element is an element whose resistance value drops with an increase in temperature.
7. The current limiting circuit according to claim 1, comprising:
  a switch configured to switch functions between a case where the terminal touches the second contact before touching the first contact and a case where the terminal touches the second contact after touching the first contact.

8. A DC power supply connector at least comprising:
a positive side electrode and a negative side electrode configured to supply DC power,
wherein at least any of the positive side electrode and the negative side electrode includes
a first contact,
a second contact provided at a position where a terminal on a power receiving side in which a DC current flows at supply of the DC power touches before touching the first contact, and
a current limiting circuit configured to decrease the current flowing into the terminal through the second contact before release of a touch between the terminal and the second contact,
the current limiting circuit does not flow a current in a case where the terminal is touching the first contact, and the current limiting circuit decreases the current flowing into the terminal through the second contact only in a case where the terminal is touching the second contact, and
the current limiting circuit gradually increases the current flowing into the terminal through the second contact when the terminal touches the second contact before touching the first contact.

9. The DC power supply connector according to claim 8, wherein the current limiting circuit decreases a potential difference between a positive electrode and a negative electrode of an apparatus that receives the DC power by gradually increasing a potential difference between the first contact and the second contact to decrease the current flowing between the second contact and the terminal.

10. The DC power supply connector according to claim 9, wherein the current limiting circuit includes a switching element configured to be brought into an on state at a time point when the terminal is no longer connected to the first contact to decrease the current flowing into the terminal through the second contact in a state where the terminal is connected only to the second contact.

11. The DC power supply connector according to claim 10, wherein the current limiting circuit includes a capacitive element configured to start being charged at a time point when the terminal is no longer connected to the first contact to raise a gate voltage of the switching element in the state where the terminal is connected only to the second contact.

12. The DC power supply connector according to claim 11, wherein the current limiting circuit includes a resistive element configured to set a time for applying a voltage to a gate terminal of the switching element in conjunction with the capacitive element.

13. The current limiting connector according to claim 12, wherein the resistive element is an element whose resistance value drops with an increase in temperature.

14. The current limiting connector according to claim 8, wherein the current limiting circuit includes a switch configured to switch functions between a case where the terminal touches the second contact before touching the first contact and a case where the terminal touches the second contact after touching the first contact.

15. A DC power source device at least comprising:
a DC power source configured to supply DC power; and
a positive side electrode and a negative side electrode configured to supply the DC power from the DC power source,
wherein at least any of the positive side electrode and the negative side electrode includes
a first contact,
a second contact provided at a position where a terminal on a power receiving side in which a DC current flows at supply of the DC power touches before touching the first contact, and
a current limiting circuit configured to decrease the current flowing into the terminal through the second contact before release of a touch between the terminal and the second contact,
the current limiting circuit does not flow a current in a case where the terminal is touching the first contact, and the current limiting circuit decreases the current flowing into the terminal through the second contact only in a case where the terminal is touching the second contact, and
the current limiting circuit gradually increases the current flowing into the terminal through the second contact when the terminal touches the second contact before touching the first contact.

16. The DC power source device according to claim 15, wherein the current limiting circuit decreases a potential difference between a positive electrode and a negative electrode of an apparatus that receives the DC power by gradually increasing a potential difference between the first contact and the second contact to decrease the current flowing between the second contact and the terminal.

17. The DC power source device according to claim 16, comprising:
a switching element configured to be brought into an on state at a time point when the terminal is no longer connected to the first contact to decrease the current flowing into the terminal through the second contact in a state where the terminal is connected only to the second contact.

18. The DC power source device according to claim 17, wherein the current limiting circuit includes a capacitive element configured to start being charged at a time point when the terminal is no longer connected to the first contact to raise a gate voltage of the switching element in the state where the terminal is connected only to the second contact.

19. The DC power source device according to claim 18, wherein the current limiting circuit includes a resistive element configured to set a time for applying a voltage to a gate terminal of the switching element in conjunction with the capacitive element.

20. The DC power source device according to claim 19, wherein the resistive element is an element whose resistance value drops with an increase in temperature.

21. The DC power source device according to claim 15, wherein the current limiting circuit includes a switch configured to switch functions between a case where the terminal touches the second contact before touching the first contact and a case where the terminal touches the second contact after touching the first contact.

22. A current limiting circuit comprising:
a switching element configured to be brought into an on state at a time point when a terminal that receives supply of DC power is no longer connected to a drain-side contact to, in a state where the terminal is connected only to a source-side contact, decrease a current flowing into the terminal through the source-side contact;
a capacitive element configured to start being charged at a time point when the terminal is no longer connected to the drain-side contact to raise a gate voltage of the switching element in the state where the terminal is connected only to the source-side contact; and
a resistive element configured to set a time for applying a voltage to a gate terminal of the switching element in conjunction with the capacitive element,
wherein the current limiting circuit is configured to gradually increase the current flowing into the terminal through the source-side contact when the terminal touches the source-side contact before touching the drain-side contact.

23. The current limiting circuit according to claim 22, configured to:
decrease a potential difference between a positive electrode and a negative electrode of an apparatus that receives the DC power by gradually increasing a potential difference between the drain-side contact and the source-side contact to decrease the current flowing between the source-side contact and the terminal.

24. The current limiting circuit according to claim 22, wherein the resistive element is an element whose resistance value drops with an increase in temperature.

25. The current limiting circuit according to claim 22, comprising:
a switch configured to switch functions between a case where the terminal touches the source-side contact before touching the drain-side contact and a case where the terminal touches the source-side contact after touching the drain-side contact.

26. A movable body comprising the current limiting circuit according to claim 1.

27. A power supply system comprising:
a battery configured to supply DC power;
a drive unit configured to be driven by the DC power supplied from the battery; and
at least one current limiting circuit according to claim 1 that is provided between the battery and the drive unit.

28. The power supply system according to claim 27, wherein the power supply system is provided for a movable body.

29. The power supply system according to claim 27, wherein the current limiting circuit decreases a potential difference between a positive electrode and a negative electrode of an apparatus that receives the DC power by gradually increasing a potential difference between the first contact and the second contact to decrease the current flowing between the second contact and the terminal.

30. The power supply system according to claim 29, comprising:
a switching element configured to be brought into an on state at a time point when the terminal is no longer connected to the first contact to decrease the current flowing into the terminal through the second contact in a state where the terminal is connected only to the second contact.

31. The power supply system according to claim 30, wherein the current limiting circuit includes a capacitive element configured to start being charged at a time point when the terminal is no longer connected to the first contact to raise a gate voltage of the switching element in the state where the terminal is connected only to the second contact.

32. The power supply system according to claim 31, wherein the current limiting circuit includes a resistive element configured to set a time for applying a voltage to a gate terminal of the switching element in conjunction with the capacitive element.

33. The power supply system according to claim 32, wherein the resistive element is an element whose resistance value drops with an increase in temperature.

34. The power supply system according to claim 27, wherein the current limiting circuit includes a switch configured to switch functions between a case where the terminal touches the second contact before touching the first contact and a case where the terminal touches the second contact after touching the first contact.

* * * * *